United States Patent
Kodera et al.

(10) Patent No.: US 10,353,852 B2
(45) Date of Patent: Jul. 16, 2019

(54) MEMORY SYSTEM THAT STORES DATA REDUNDANTLY

(71) Applicant: TOSHIBA MEMORY CORPORATION, Tokyo (JP)

(72) Inventors: Shunsuke Kodera, Yokohama Kanagawa (JP); Yoshio Furuyama, Yokosuka Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 0 days.

(21) Appl. No.: 15/061,778

(22) Filed: Mar. 4, 2016

(65) Prior Publication Data

US 2017/0060453 A1 Mar. 2, 2017

(30) Foreign Application Priority Data

Aug. 28, 2015 (JP) .................................. 2015-169602

(51) Int. Cl.
  *G06F 3/06* (2006.01)
  *G06F 13/42* (2006.01)
  *G06F 11/10* (2006.01)

(52) U.S. Cl.
  CPC ........ *G06F 13/4282* (2013.01); *G06F 3/0617* (2013.01); *G06F 3/0619* (2013.01);
  (Continued)

(58) Field of Classification Search
  CPC ...... G06F 3/0619; G06F 3/065; G06F 3/0659; G06F 3/0688; G06F 11/1004; G06F 13/4282; G06F 3/0617
  (Continued)

(56) References Cited

U.S. PATENT DOCUMENTS 6,011,741 A * 1/2000 Wallace ................ G06F 3/0601
  365/221
6,185,134 B1 * 2/2001 Tanaka ................ G06F 11/1433
  365/185.33
(Continued)

FOREIGN PATENT DOCUMENTS

JP   2005-215824 A   8/2005
JP   2005-242903     9/2005
(Continued)

OTHER PUBLICATIONS

Machine Translation of JP 2010-0079856, provided by Espace.net, JP application published Apr. 8, 2010, 16 pages.*

(Continued)

*Primary Examiner* — Reginald G Bragdon
*Assistant Examiner* — Aaron D Ho
(74) *Attorney, Agent, or Firm* — Kim & Stewart LLP

(57) ABSTRACT

A memory system includes a semiconductor memory device including a plurality of memory blocks, including a first block storing data and a second block storing backup data, a plurality of pins, and a controller configured to output a control signal to the semiconductor memory in accordance with the command. When the controller receives from outside of the memory system, a read command for the data in the first block, and the data in the first block are available, the controller is configured to transmit the data in the first block to the outside of the memory system. When the controller receives from outside of the memory system, a read command for the data in the first block, and the data in the first block are not available, the controller is configured to transmit the backup data in the second block to the outside of the memory system.

14 Claims, 28 Drawing Sheets

(52) U.S. Cl.
 CPC ......... *G06F 11/1048* (2013.01); *G06F 3/065* (2013.01); *G06F 3/0688* (2013.01)

(58) Field of Classification Search
 USPC ........................................................ 711/162
 See application file for complete search history.

(56) References Cited

U.S. PATENT DOCUMENTS

| | | | | |
|---|---|---|---|---|
| 6,560,703 | B1* | 5/2003 | Goodman | G06F 9/4403 713/2 |
| 6,665,813 | B1* | 12/2003 | Forsman | G06F 11/1004 714/15 |
| 6,851,015 | B2* | 2/2005 | Akahane | G11C 16/105 365/228 |
| 7,185,191 | B2* | 2/2007 | Bosley | G06F 11/1433 713/1 |
| 7,313,022 | B2 | 12/2007 | Takeuchi et al. | |
| 7,409,623 | B2* | 8/2008 | Baker | G06F 11/1004 714/763 |
| 7,502,977 | B2* | 3/2009 | Venkatraman | G11C 29/76 365/227 |
| 7,558,900 | B2* | 7/2009 | Jigour | G11C 7/1045 710/105 |
| 7,594,062 | B2* | 9/2009 | In | G06F 3/0616 711/103 |
| 7,861,139 | B2* | 12/2010 | Murray | G06F 11/1072 714/763 |
| 8,135,991 | B2 | 3/2012 | Katano et al. | |
| 8,443,263 | B2* | 5/2013 | Selinger | G06F 11/1068 714/768 |
| 8,458,564 | B2* | 6/2013 | Murray | G06F 11/1072 714/763 |
| 8,726,087 | B2 | 5/2014 | Shibata et al. | |
| 8,732,466 | B2 | 5/2014 | Nagai et al. | |
| 9,063,903 | B2 | 6/2015 | Sukegawa | |
| 9,495,245 | B2* | 11/2016 | Peddle | G06F 13/28 |
| 2002/0099995 | A1* | 7/2002 | Furukawa | G06F 11/1068 714/766 |
| 2007/0136502 | A1* | 6/2007 | Wen | G06F 13/4291 710/110 |
| 2009/0103362 | A1* | 4/2009 | Pekny | G06F 13/1694 365/185.04 |
| 2013/0346671 | A1* | 12/2013 | Michael | G06F 12/0246 711/103 |
| 2014/0006688 | A1* | 1/2014 | Yu | G11C 16/10 711/103 |
| 2014/0022849 | A1* | 1/2014 | Krutzik | G06F 21/80 365/185.33 |
| 2014/0085982 | A1* | 3/2014 | Asaoka | G11C 16/06 365/185.17 |
| 2015/0067419 | A1* | 3/2015 | Raghu | G11C 16/10 714/721 |
| 2015/0089179 | A1* | 3/2015 | Kurita | G06F 3/0659 711/170 |

FOREIGN PATENT DOCUMENTS

| | | |
|---|---|---|
| JP | 2010-079856 | 4/2010 |
| JP | 2012-252557 A | 12/2012 |
| JP | 2013-069171 A | 4/2013 |
| JP | 2014-038593 A | 2/2014 |

OTHER PUBLICATIONS

Forney, G.D., "Chapter 8—Reed-Solomon codes", retrieved from Winter 2007 EE392D lecture notes, PDF hosted by Stanford University, 15 pages.*
Choi, K., "NAND Flash memory", May 7, 2010, published by Samsung Electronics, 48 pages.*
T. Tanzawa et al., "A compact on-chip ECC for low cost flash memories," in IEEE Journal of Solid-State Circuits, vol. 32, No. 5, pp. 662-669, May 1997. doi: 10.1109/4.568829.*
Macronix International Co., Ltd., "Booting from NAND Flash Memory", Dec. 12, 2013 (Year: 2013).*
Micron Technology, Inc., "TN-29-59: Bad Block Management in NAND Flash Memory", rev. 2011 (Year: 2011).*
NXP Semiconductors, "AN10860: LPC313x NAND flash data and bad block management", Aug. 11, 2009 (Year: 2009).*
Japanese Office Action dated May 22, 2018, filed in counterpart Japanese Patent Application No. 2015-169602 (24 pages) (with translation).
NAND Flash Memory, Serial Peripheral Interface (SPI), Data sheet, MT29F1G01AAADD, Micron Technology, Inc., 2010, 23 pages.
Japanese Office Action dated Dec. 13, 2018, filed in counterpart Japanese Patent Application No. 2015-169602, 7 pages (with machine translation).

* cited by examiner

FIG. 3

| Pin no. | Pin function |
|---|---|
| 1 | Hold input(/HOLD) / serial data output3(SO3) |
| 2 | Power supply(Vcc) |
| 3 | No connection(NC) |
| 4 | No connection(NC) |
| 5 | No connection(NC) |
| 6 | No connection(NC) |
| 7 | Chip select(/CS) |
| 8 | Serial data output(SO) / serial data output1(SO1) |
| 9 | Write protect(/WP) / serial data output2(SO2) |
| 10 | Ground(Vss) |
| 11 | No connection(NC) |
| 12 | No connection(NC) |
| 13 | No connection(NC) |
| 14 | No connection(NC) |
| 15 | Serial data input(SI) / serial data output0(SO0) |
| 16 | Serial clock input(SCK) |

FIG. 4

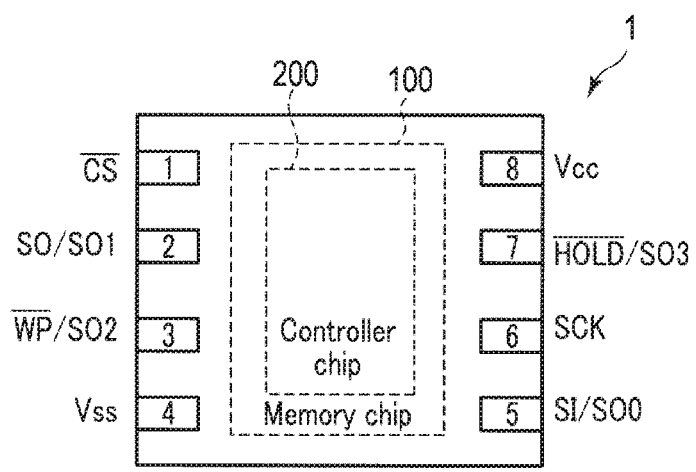

FIG. 5

| Pin no. | Pin function |
|---|---|
| 1 | Chip select(/CS) |
| 2 | Serial data output(SO) / serial data output1(SO1) |
| 3 | Write protect(/WP) / serial data output2(SO2) |
| 4 | Ground(Vss) |
| 5 | Serial data input(SI) / serial data output0(SO0) |
| 6 | Serial clock input(SCK) |
| 7 | Hold input(/HOLD) / serial data output3(SO3) |
| 8 | Power supply(Vcc) |

| Address | Bit | | | | | | | |
|---------|---|---|---|---|---|---|---|---|
| | 7 | 6 | 5 | 4 | 3 | 2 | 1 | 0 |
| C0h | Reserved | Reserved | ECCS1 (R) | ECCS0 (R) | PRG_F (R) | ERS_F (R) | WEL (R/W) | OIP (R) |

MEMORY SYSTEM THAT STORES DATA REDUNDANTLY

CROSS-REFERENCE TO RELATED APPLICATION

This application is based upon and claims the benefit of priority from Japanese Patent Application No. 2015-169602, filed Aug. 28, 2015, the entire contents of which are incorporated herein by reference.

FIELD

Embodiments described herein relate generally to a memory system, in particular, a memory system that stores data redundantly.

BACKGROUND

A NAND-type flash memory is widely known as one type of a memory device.

DESCRIPTION OF THE DRAWINGS

FIG. 3 illustrates functions of external terminals of the memory system according to the first embodiment.

FIG. 4 is an exterior plan view of another memory system according to the first embodiment.

FIG. 5 illustrates functions of external terminals of the memory system shown in FIG. 4.

DETAILED DESCRIPTION

Figure 1:
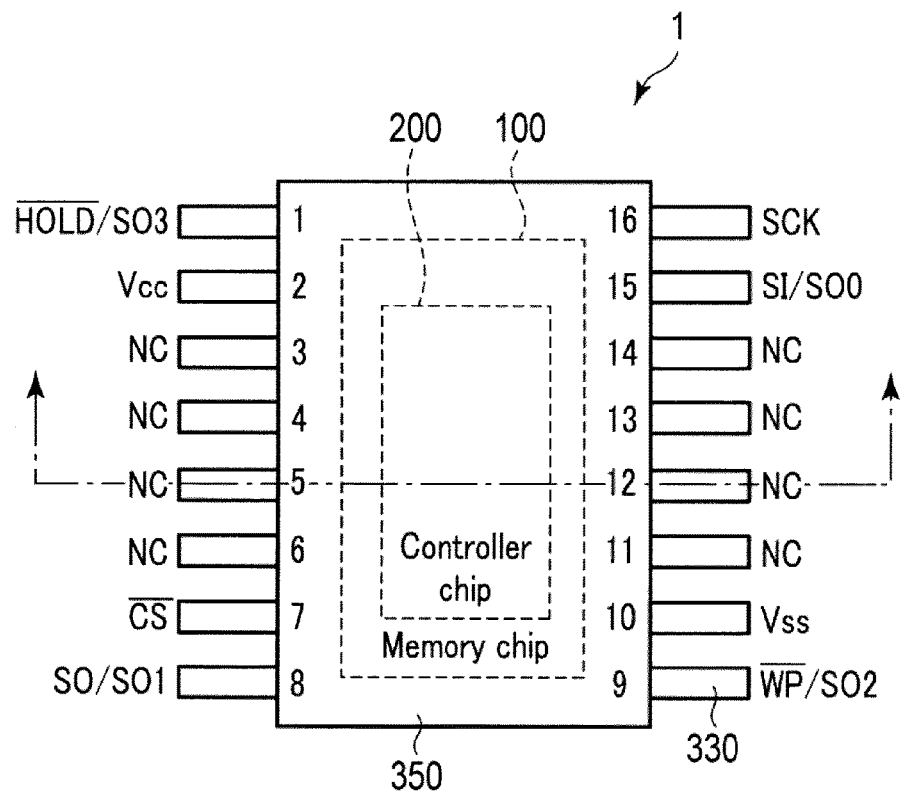
FIG. 1 is an exterior plan view of a memory system according to a first embodiment.

One or more embodiments are directed to providing a memory system capable of improving operation reliability.

In general, according to an embodiment, a memory system includes a semiconductor memory device including a plurality of memory blocks, including a first block storing data and a second block storing backup data, a plurality of pins for connection to the outside of the memory system, the pins including a first pin configured to receive a chip select signal, a second pin configured to receive a clock signal, and a third pin configured to receive a command in synchronization with the clock signal, and a controller configured to output a control signal to the semiconductor memory in accordance with the command. When the controller receives from outside of the memory system, a read command for the data in the first block, and the data in the first block are available, the controller is configured to transmit the data in the first block to the outside of the memory system. When the controller receives from outside of the memory system, a read command for the data in the first block, and the data in the first block are not available, the controller is configured to transmit the backup data in the second block to the outside of the memory system.

Hereinafter, embodiments will be described with reference to the drawings. In the following description, elements having the same function and configuration are described with the same reference numerals.

1. First Embodiment

A memory system according to a first embodiment will be described.

1.1 Configuration 1.1.1 Entire Configuration of Memory System

First, an entire configuration of the memory system according to the present embodiment will be described with reference to FIGS. 1 and 2. FIG. 1 is an exterior plan view of the memory system according to the present embodiment, and FIG. 2 is a cross-sectional view thereof taken along the line II-II in FIG. 1.

As illustrated, a memory system 1 includes two semiconductor chips (modules) 100 and 200. The semiconductor chip (memory chip) 100 includes a semiconductor memory such as a NAND-type flash memory, and the semiconductor chip 200 (controller chip) includes a controller which controls the memory chip 100. The semiconductor chips 100 and 200 are mounted on a lead frame 300, and are packaged by being sealed with a resin 350.

Figure 2:
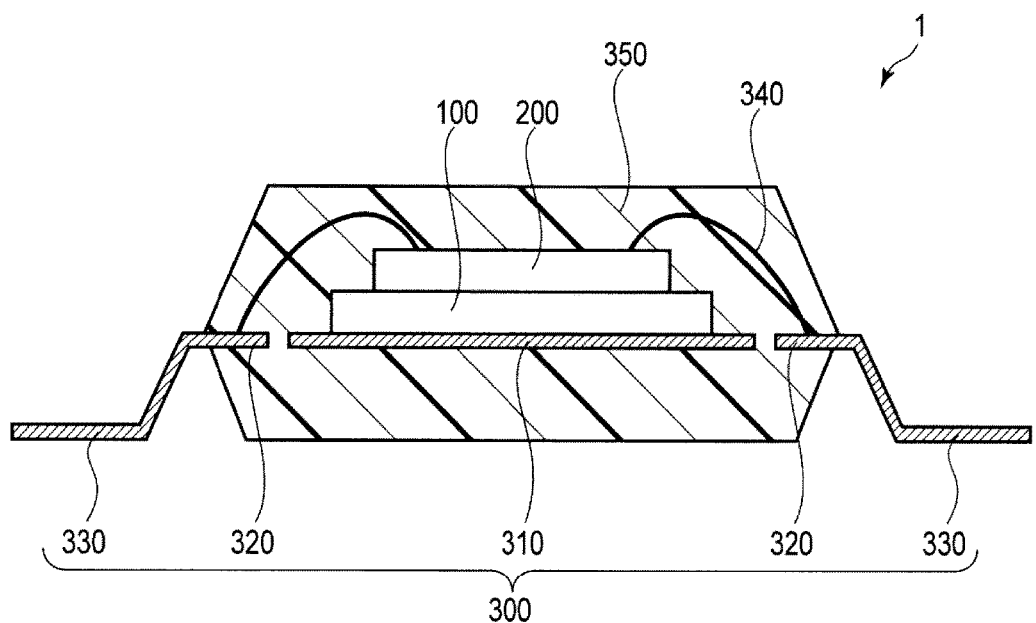
FIG. 2 is a cross-sectional view of the memory system according to the first embodiment.

More specifically, as illustrated in FIG. 2, the memory chip 100 is mounted on a die pad 310 of the lead frame 300, and the controller chip 200 is superposed on the memory chip 100.

The controller chip 200 is connected to an inner lead 320 of the lead frame via, for example, a bonding wire 340, and is also connected to the memory chip 100 via a bonding wire (not illustrated). The memory chip 100, the controller chip 200, the die pad 310, the inner lead 320, and the bonding wire 340 are sealed with, for example, the resin 350.

The inner lead 320 is connected to an outer lead 330 which is exposed to the outside of the resin 350. The outer lead 330 functions as an external connection terminal (external connection pin) of the memory system 1. In FIG. 1, sixteen external connection terminals including first to sixteenth pins, are provided. The memory system 1 performs communication with a host apparatus which controls the memory system 1 (more specifically, accesses the memory chip) via the pins.

FIG. 3 illustrates functions of the respective pins. As illustrated, the first pin is used to receive a control signal /HOLD, or to output serial data SO3. The control signal /HOLD is asserted (has an "L" level) when communication between the host apparatus and the memory system 1 is temporarily stopped. The second pin receives a power supply voltage Vcc. The third to sixth pins and the eleventh to fourteenth pins are reserved pins, and may be used, for example, when a certain signal or data are required to be transmitted and received in the future. The seventh pin receives a chip select signal /CS. The chip select signal /CS is a signal for activating the memory chip 100 and the controller chip 200 (in other words, a signal is asserted when accessing the memory system 1), and is asserted (has an "L" level), for example, at a timing at which the host apparatus inputs a command to the memory system 1. The eighth pin is used to output serial data (SO or SO1). The ninth pin is used to receive a control signal /WP or to output serial data (SO2). The control signal /WP is a write protect signal, and is asserted (has an "L" level) when writing to the memory chip is inhibited. The tenth pin receives a reference potential Vss. The fifteenth pin is used to receive serial data (SI) or to output serial data (SO0). The sixteenth pin receives a serial clock signal SCK.

The pin configuration conforms to the serial peripheral interface (SPI). The first pin, the eighth pin, the ninth pin, and the fifteenth pin are arbitrarily selected for use in outputting serial data, and can output data to the host apparatus at 1-time speed, 2-time speed or 4-time speed.

FIG. 4 illustrates an example of a package configuration which is different from the one illustrated in FIG. 1. In FIG. 4, eight external connection terminals including first to eighth pins are provided. FIG. 5 illustrates functions of the respective pins shown in FIG. 4.

As illustrated, the first pin receives the chip select signal/CS. The second pin outputs the serial data SO and SO1. The third pin receives the write protect signal /WP or outputs the serial data SO2. The fourth pin receives the reference potential Vss. The fifth pin receives the serial data SI or outputs the serial data SO0. The sixth pin receives the serial clock. The seventh pin receives the control signal /HOLD or outputs the serial data SO3. The eighth pin receives the power supply voltage Vcc. Also in this case, the pin configuration conforms to the SPI.

Figure 6:
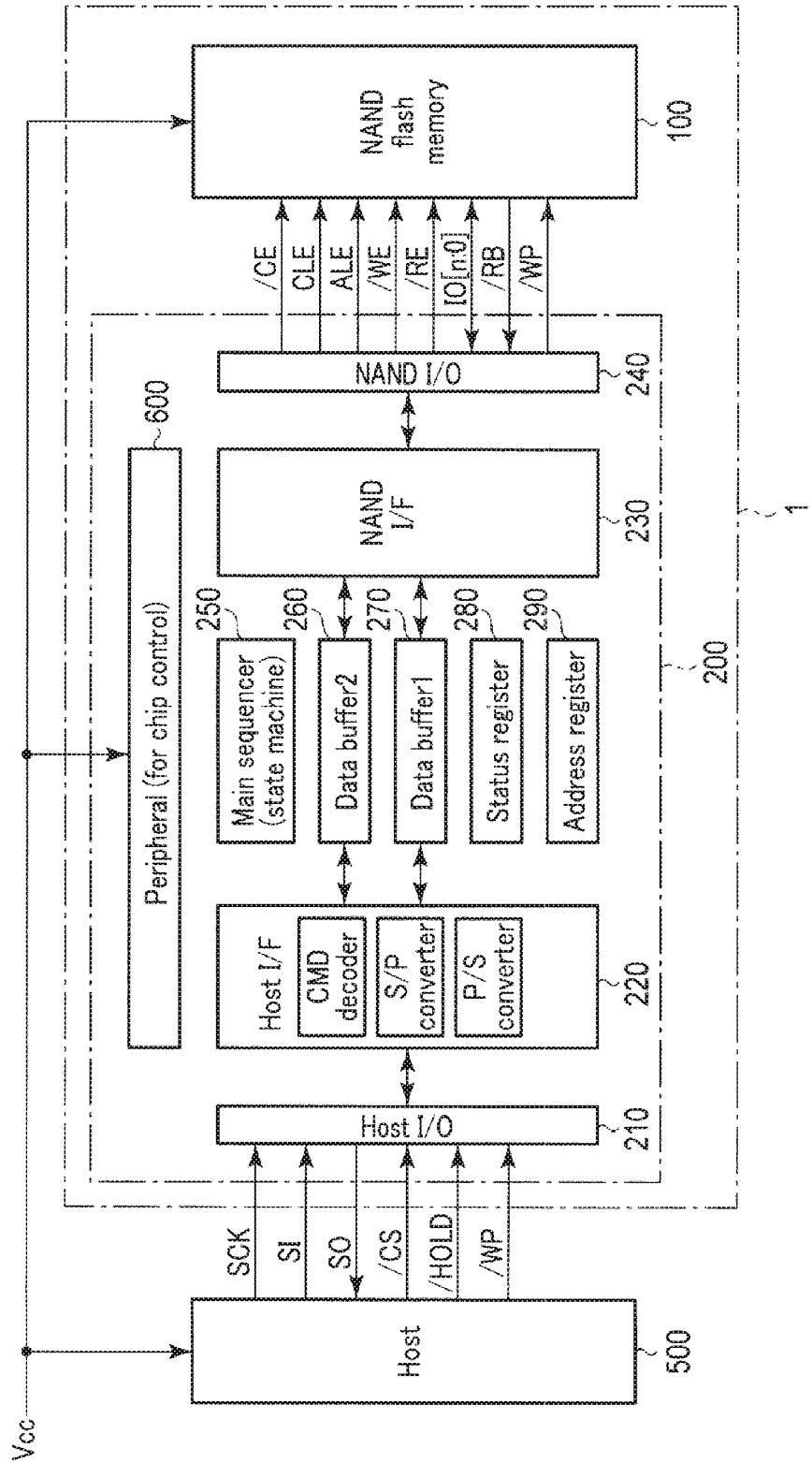
FIG. 6 is a block diagram of the memory system according to the first embodiment.

FIG. 6 is a functional block diagram illustrating an internal configuration of the memory system 1. Hereinafter, the memory chip 100 is referred to as a NAND-type flash memory 100, and the controller chip 200 is simply referred to as a controller 200.

As illustrated, the memory system 1 includes the NAND-type flash memory 100 and the controller 200.

The NAND-type flash memory 100 includes a plurality of memory cells, each including a plurality of memory cells serially connected (i.e., connected in series), and stores data in a nonvolatile manner. The controller 200 is connected to the NAND-type flash memory 100 via NAND buses, and is connected to a host apparatus 500 via SPI buses. The controller 200 controls access to the NAND-type flash memory 100.

Each of the NAND buses performs transmission and reception of signals based on a NAND interface protocol. Specific examples of the signals include a chip enable signal /CE, an address latch enable signal ALE, a command latch enable signal CLE, a write enable signal /WE, a read enable signal /RE, a ready busy signal /RB, an input or output signal I/O, and a write protect signal /WP.

The signal /CE is asserted in a low level so as to activate the NAND-type flash memory 100, when accessing the NAND-type flash memory 100. The signals CLE and ALE are used to notify the NAND-type flash memory 100 that input signals I/O to the NAND-type flash memory 100 are respectively a command and an address. The signal /WE is asserted in a low level so that the input signal I/O is input to the NAND-type flash memory 100. The signal /RE is also asserted in a low level so that the output signal I/O is read from the NAND-type flash memory 100. The ready busy signal /RB indicates whether the NAND-type flash memory 100 is in a ready state (a state of being capable of receiving a command from the controller 200) or in a busy state (a state of being incapable of receiving a command from the controller 200), and a low level thereof indicates the busy state. The input or output signal I/O is, for example, an 8-bit (n=8) signal. The input or output signal I/O contains data which are transmitted and received between the NAND-type flash memory 100 and the controller 200, and includes a command, an address, data to be written, or read data. The signal /WP is a signal for inhibiting data from being written to the NAND-type flash memory 100.

The SPI buses are substantially similar to the ones described with reference to FIGS. 3 and 5.

1.1.2 Configuration of Controller 200

Next, with reference to FIG. 6, details of a configuration of the controller 200 will be described. As illustrated, the controller 200 includes a host input/output circuit 210, a host interface circuit 220, a NAND interface circuit 230, a NAND input/output circuit 240, a sequencer (state machine) 250, data buffers 260 and 270, a status register 280, an address register 290, and a peripheral circuit 600.

The host input/output circuit 210 functions as a buffer of signals which are transmitted to and received from the host apparatus 500. The signals SCK, SI, /CS, /HOLD and /WP are first received by the host input/output circuit 210 and are then output to the host interface circuit 220.

The host interface circuit 220 receives the signal SI in synchronization with the signal SCK. The host interface circuit 220 transmits the signal SO which is received in synchronization with the signal SCK, to the host apparatus 500 via the host input/output circuit 210.

The host interface circuit 220 controls transmission and reception of signals with the host apparatus 500 via the host input/output circuit 210. The host interface circuit 220 functions as a serial/parallel converter and a parallel/serial converter. For example, the input signal SI from the host apparatus 500 is converted from a serial signal into a parallel signal, and data read from the NAND-type flash memory 100 is converted from a parallel signal into a serial signal. If the input signal SI is a command, the host interface circuit 220 functions as a command decoder and decodes the received command. A decoded result is output to, for example, the sequencer 250.

The data buffers 260 and 270 temporarily holds data to be written that are received from the host apparatus 500, via the host interface circuit 220. Data read from the NAND-type flash memory 100 are received via the NAND interface circuit 230 and temporarily held.

The status register 280 holds various kinds of status information of the memory system 1. For example, a feature table (described below) is held.

The address register 290 holds an address received from the host apparatus 500, via the host interface circuit 220.

The NAND interface circuit 230 controls transmission and reception of signals to and from the NAND-type flash memory 100 via the NAND input/output circuit 240. The NAND interface circuit 230 issues various commands conforming to the NAND interface protocol in response to a command from the sequencer 250, and outputs the commands to the NAND-type flash memory 100 along with an address in the address register 290 via the NAND input/output circuit 240. During writing of data, the data in at least one of the data buffer 260 and 270 are output to the NAND-type flash memory 100 via the NAND input/output circuit 240. During reading of data, data read from the NAND-type flash memory 100 are transmitted to at least one of the data buffer 260 and 270.

The NAND input/output circuit 240 functions as a buffer of signals which are transmitted to or received from the NAND-type flash memory 100. The NAND input/output circuit 240 asserts or deasserts the signals /CE, CLE, ALE, /WE, /RE and /WP in response to commands from the NAND interface circuit 230. During reading of data, the NAND input/output circuit 240 temporarily holds a signal IO (read data) and transmits the signal to the NAND interface circuit 230. During writing of data, the NAND input/output circuit 240 temporarily holds a signal IO (data to be written) and transmits the signal to the NAND-type flash memory 100. The ready busy signal /RB is received from the NAND-type flash memory 100 and is transmitted to the NAND interface circuit 230.

The sequencer 250 controls the entire operation of the controller 200. For example, if a data reading request is received from the host apparatus 500, the sequencer 250 instructs the NAND interface circuit 230 to execute an operation for performing a reading operation. If a data writing request is received from the host apparatus 500, the sequencer 250 instructs the NAND interface circuit 230 to execute an operation for performing a writing operation. The feature table in the status register 280 is updated based on status information received from the NAND-type flash memory 100.

The peripheral circuit 600 receives the power supply voltage Vcc from an external device, transmits the voltage to each circuit block, and performs other control which is necessary in an operation of the controller 200.

1.1.3 Configuration of NAND-type Flash Memory 100

Figure 7:
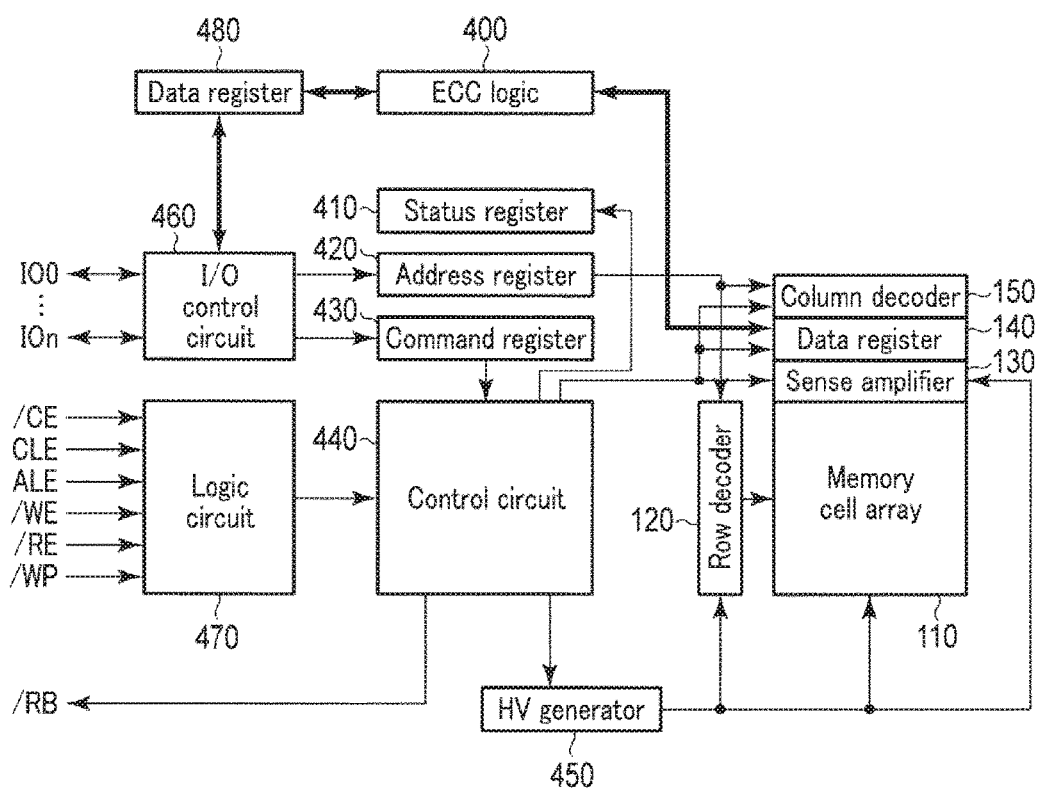
FIG. 7 is a block diagram of a semiconductor memory device according to the first embodiment.

Next, with reference to FIG. 7, a configuration of the NAND-type flash memory 100 will be described. FIG. 7 is a block diagram of the NAND-type flash memory 100.

As illustrated, the NAND-type flash memory 100 includes a memory cell array 110, a row decoder 120, a sense amplifier 130, a data register 140, a column decoder 150, an error correction code (ECC) circuit 400, a status register 410, an address register 420, a command register 430, a control circuit 440, a voltage generation circuit 450, an input/output control circuit 460, a logic circuit 470, and a data register 480.

The memory cell array 110 includes a plurality of non-volatile memory cells arranged in rows and columns. Memory cells in the same row are connected to the same word line, and memory cells in the same column are connected to the same bit line. Reading and writing of data are collectively performed on a plurality of memory cells connected to the same word line. This unit of reading and writing data is referred to as a page. Data corresponding to one page includes net data and management data. The net data are managed in the unit called a sector. For example, in the present embodiment, one page includes four sectors, and each sector has a data size of 512 bytes. The management data include, for example, ECC data (parity) for correcting errors. The error correction is performed on a per sector basis. Therefore, the management data include ECC data which are prepared for one sector. Erasing of data is collectively performed in units of a plurality of pages, referred to as a block.

The row decoder 120 decodes a row address for designating a row of the memory cell array 110. A word line is selected based on a decoded result, and voltages which are required to write, read, and erase data are applied thereto.

During reading of data, the sense amplifier 130 senses data read from the memory cell array 110 and transmits the data to the data register 140. During writing of data, data in the data register 140 are transmitted to the memory cell array 110.

The data register 140 temporarily holds data to be written or read data corresponding to one page.

The column decoder 150 decodes a column address of a column of the memory cell array 110. Based on a decoded result, data are transmitted to the data register during writing of data, and data are read from the data register during reading of data.

The ECC circuit 400 performs error detection and error correction processes. More specifically, during writing of data, the ECC circuit 400 generates parity for each sector based on data received from the controller 200, and transmits the parity and net data to the data register 140. During reading of data, the ECC circuit 400 generates a syndrome for each sector based on parity included in data transmitted from the data register 140, and detects the presence or absence of an error. If an error is detected, a bit position thereof is specified, and the error is corrected. The number of error bits which can be corrected for each sector is, for example, 8 bits per sector in the present embodiment. The ECC circuit 400 may output the number of error bits detected in each sector to the status register 410 as status information.

The logic circuit 470 receives the signals /CE, CLE, ALE, /WE, /RE, and /WP from the controller 200.

The input/output control circuit 460 receives a signal IO [n:0]. If the signal IO is an address (if ALE="H"), the input/output control circuit 460 holds the address in the address register 420. If the signal IO is a command (if CLE="H"), the command is held in the command register 430. If the signal IO is data (if ALE=CLE="L"), the data are held in the data register 480.

The status register 410 holds various kinds of status information of the NAND-type flash memory 100. The status information includes information indicating the number of error bits provided from the ECC circuit 400, and information indicating whether or not a writing operation and a reading operation is successful (passed) or unsuccessful (failed), provided from the control circuit 440.

The control circuit 440 controls the entire NAND-type flash memory 100 based on commands held in the command register 430 and various signals input to the logic circuit 470. The control circuit 440 generates the ready busy signal /RB and outputs the signal to the controller 200.

The voltage generation circuit 450 generates voltage required in data writing, reading and erasing operations based on a command from the control circuit 440, and supplies the voltages to the memory cell array 110, the row decoder 120, and the sense amplifier 130.

1.2 Operations

Next, data reading, writing, and erasing operations in the memory system according to the present embodiment will be described, focusing on signals which are transmitted and received via the SPI buses and the NAND buses.

1.2.1 Reading Operation

First, the reading operation will be described. The reading operation includes the following three steps.

(1) Reading of data from the NAND-type flash memory: Through this step, data are read from the NAND-type flash memory 100 to the controller 200.

(2) Feature table reading (referred to as Get feature in some cases): Through this step, whether the memory system 1 is in a busy state or a ready state is determined, that is, whether or not the operation in the step (1) is completed is determined.

(3) Reading of data from the controller 200: Through this step, the data read to the controller 200 in the step (1) are read to the host apparatus 500.

Figure 8:
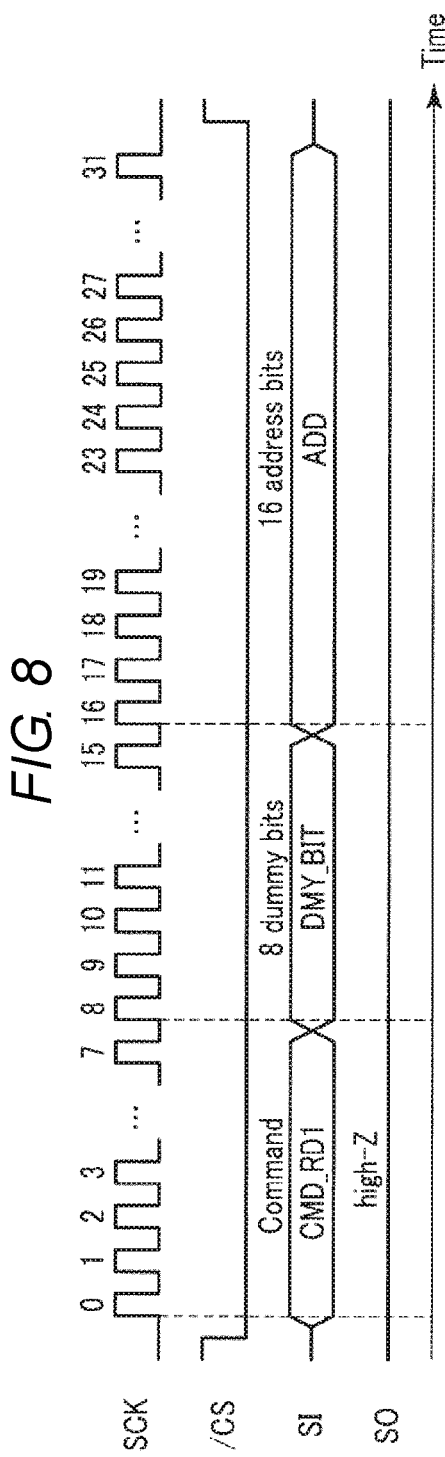
FIGS. 8-11 are timing charts of various signals during reading of data in the memory system according to the first embodiment.

FIG. 8 is a timing chart of various signals on the SPI buses during execution of the step (1). As illustrated, the host apparatus 500 asserts the signal /CS, issues a first read command CMD_RD1 as the signal SI, and also issues the clock SCK.

The host interface circuit 220 of the controller 200 recognizes the signal SI when the signal /CS is asserted and the initial clock SCK is received, as a command. The command is, for example, an 8-bit signal which is input for 8 clock cycles. The first read command CMD_RD1 is received, and then the sequencer 250 starts a data reading sequence.

Next, the host apparatus 500 transmits dummy bits DMY_BIT to the controller 200, for example, for 8 clock cycles, and then transmits an address ADD to the controller 200, for example, for 16 clock cycles. After the address ADD is transmitted, the host apparatus 500 deasserts the signal /CS. The address ADD is an address for designating a block and a page in the NAND-type flash memory 100, and is held in the address register 290.

As described above, when a specific command is received, what kind of signal is subsequently input (command sequence) is defined in advance. In other words, for example, if the first read command CMD_RD1 is received, the controller 200 recognizes that the signal SI which is input for subsequent 8 clock cycles is meaningless dummy data, and the signal SI which is input in subsequent 16 clock cycles is an address signal.

Figure 9:
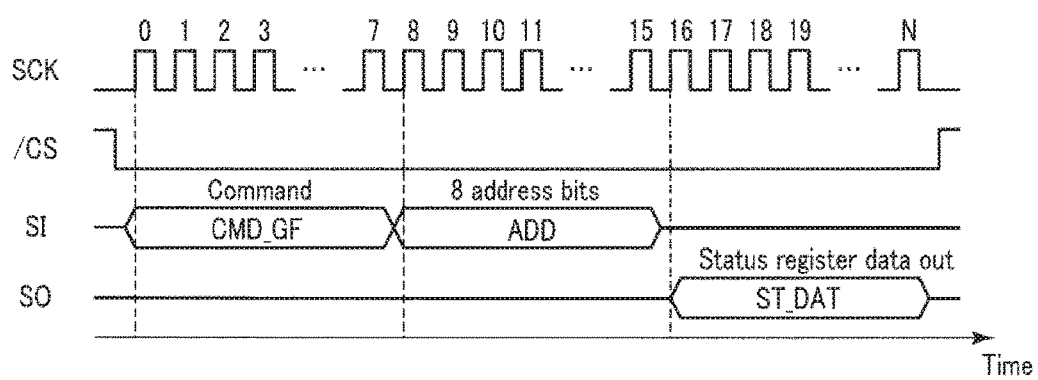

The operation in the step (2) is performed following the operation in the step (1). FIG. 9 is a timing chart of various signals on the SPI buses during execution in the step (2). As illustrated, the host apparatus 500 asserts the signal /CS again, issues a Get feature command CMD_GF as the signal SI, and also issues the clock SCK.

Next, the host apparatus 500 transmits an address ADD to the controller 200, for example, for 8 clock cycles. The address ADD is in the feature table, and naturally designates a region in which ready busy information is stored. In the controller 200, after the address ADD is received, the host interface circuit 220 reads an entry designated in the feature table from the status register 280 in response to a command from the sequencer 250, and transmits the entry to the host apparatus 500 as 8-bit status data ST_DAT for 8 clock cycles. The status data ST_DAT includes the ready busy information. After the status data ST_DAT is received, the host apparatus 500 deasserts the signal /CS.

Figure 10:
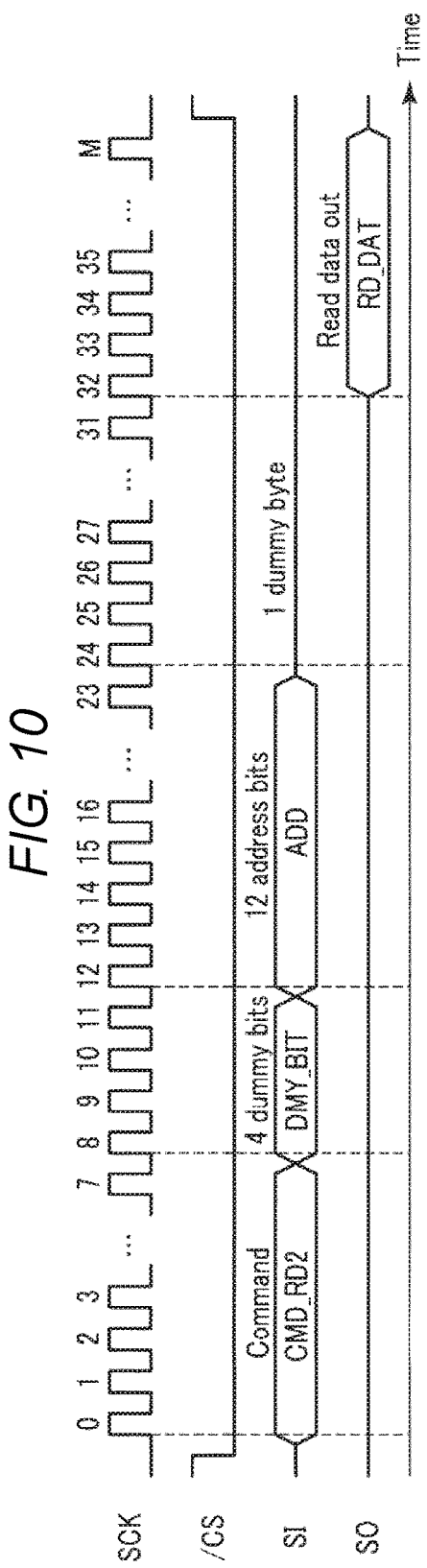

If the received status data ST_DAT indicates that the memory system 1 is in a ready state, the operation in the step (3) is performed. FIG. 10 is a timing chart of various signals on the SPI buses during execution of the step (3). As illustrated, the host apparatus 500 asserts the signal /CS, issues a second read command CMD_RD2 as the signal SI, and also issues the clock SCK.

Next, the host apparatus 500 transmits dummy bits DMY_BIT to the controller 200, for example, for 4 clock cycles, and then transmits an address ADD to the controller 200, for example, for 12 clock cycles. The address ADD designates a region in the data buffer 260 or 270 of the controller 200, and designates a column of a page in the NAND-type flash memory 100. The address ADD is held in the address register 290. Then, the host interface circuit 220 reads data from the data buffer 260 or 270, for example, under the control of the sequencer 250. After the 8 clock cycles, the host interface circuit 220 transmits the data RD_DAT read from the data buffer 260 or 270 to the host apparatus 500.

Figure 11:
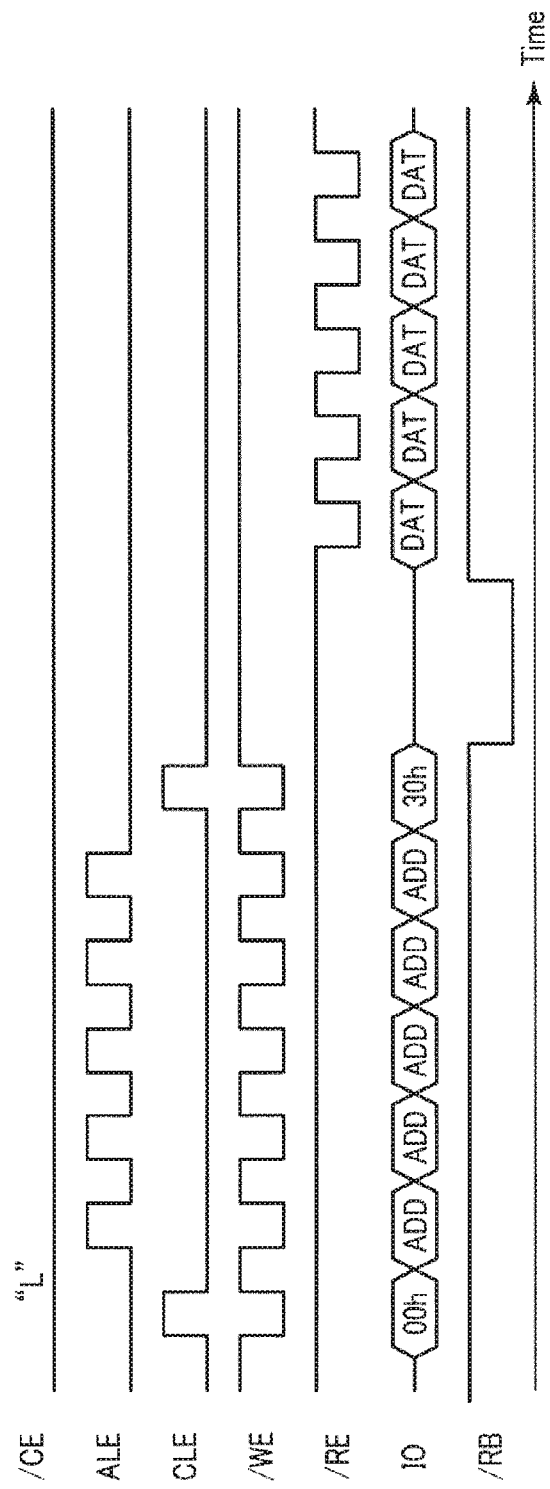

FIG. 11 is a timing chart of various signals on the NAND bus during execution of the step (1). After the first read command CMD_RD1 is received in the controller 200, the NAND interface circuit 230 issues an address input command "00h", for example, under the control of the sequencer 250, and transmits the command to the NAND-type flash memory 100. Subsequently, an address ADD is transmitted to the NAND-type flash memory 100, for example, for 5 clock cycles, and then a read command "30h" is issued and transmitted to the NAND-type flash memory 100. The address ADD includes addresses indicating a block, a page, and a column, held in the address register 290 in the operations illustrated in FIGS. 8 and 10.

An operation of reading data from the memory cell array 110 is started in the NAND-type flash memory 100 in response to the command "30h", and thus the NAND-type flash memory 100 is brought into a busy state (/RB="L").

If reading of the data from the memory cell array 110 is completed, the NAND-type flash memory 100 is brought into a ready state. The controller 200 toggles the signal /RE in response thereto. Then, the data are transmitted from the NAND-type flash memory 100 to the controller 200 in synchronization with the signal /RE.

1.2.2 Writing Operation

Next, the writing operation will be described. The writing operation includes the following three steps.

(1) Transmission of data from the host apparatus 500 to the controller 200

(2) Writing of the transmitted data to the NAND-type flash memory 100

(3) Feature table reading (Get feature): Through this step, whether writing of the data to the NAND-type flash memory 100 is passed or failed is determined.

Figure 12:
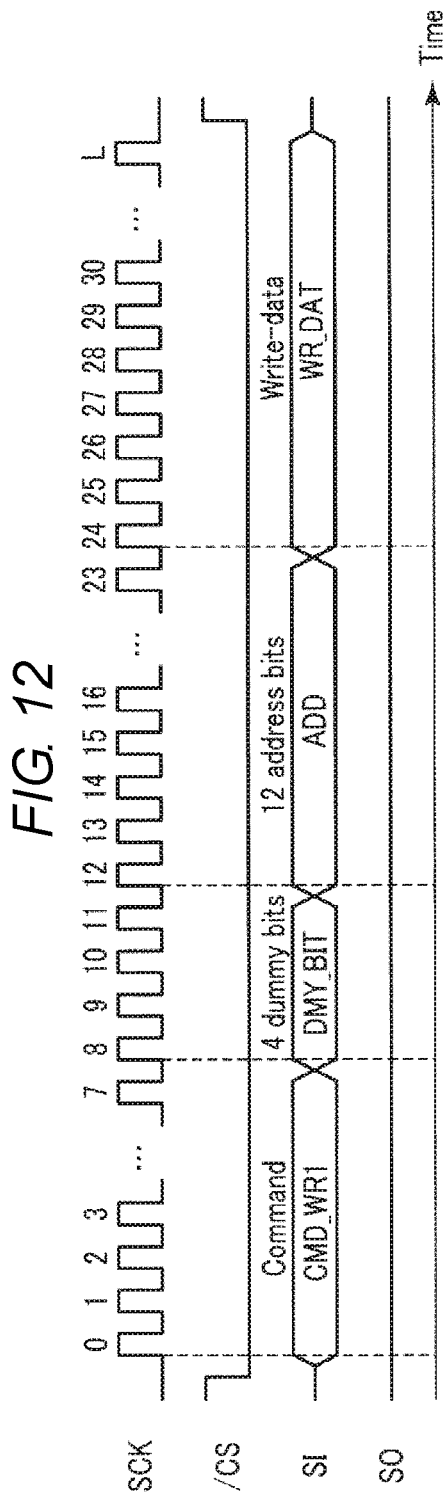
FIGS. 12-14 are timing charts of various signals during writing of data in the memory system according to the first embodiment.

FIG. 12 is a timing chart of various signals on the SPI buses during execution of the step (1). As illustrated, the host apparatus 500 asserts the signal /CS, issues a first write command CMD_WR1 as the signal SI, and also issues the clock SCK. If the first write command CMD_WR1 is received, the sequencer 250 starts a data writing sequence.

Next, the host apparatus 500 transmits dummy bits DMY_BIT to the controller 200, for example, for 4 clock cycles, and then transmits an address ADD to the controller 200, for example, for 12 clock cycles. The address ADD designates a region in the data buffer 260 or 270, and designates a column of a page in the NAND-type flash memory 100. The address ADD is held in the address register 290. The host apparatus 500 transmits data to be written WR_DAT to the controller 200. The data to be written WR_DAT is held in the region corresponding to the address ADD received immediately before, in the data buffer 260 or 270. After the data WR_DAT is transmitted, the host apparatus 500 deasserts the signal /CS.

Figure 13:
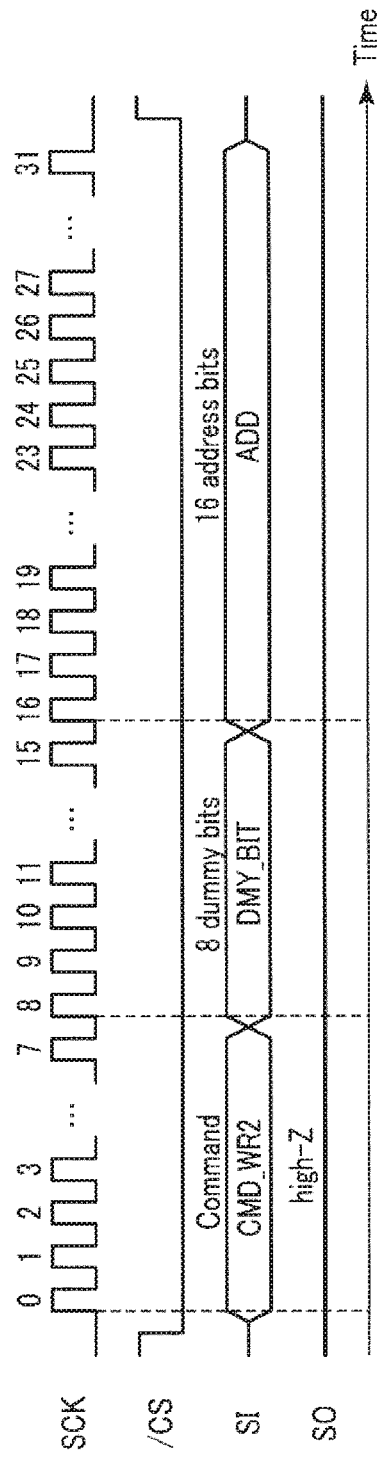

The step (2) is performed following the step (1). FIG. 13 is a timing chart of various signals on the SPI bus during execution of the step (2). As illustrated, the host apparatus 500 asserts the signal /CS again, issues a second write command CMD_WR2 as the signal SI, and also issues the clock SCK. If the second write command CMD_WR2 is received, the sequencer 250 recognizes that a command for the step (2) is received.

Next, the host apparatus 500 transmits 8 dummy bits DMY_BIT to the controller 200, for example, for 8 clock cycles, and then transmits a 16-bit address ADD to the controller 200, for example, for 16 clock cycles. The address ADD designates a block and a page in the NAND-type flash memory 100, and is held in the address register 290. After the address ADD is transmitted, the host apparatus 500 deasserts the signal/CS.

The step (3) is performed following the step (2). A command sequence in this operation is the same as in FIG. 9 referred to for description of the reading operation. If the received status data ST_DAT indicates that the memory system 1 is in a ready state, the host apparatus 500 subsequently makes a request for information indicating whether writing of data is passed or failed.

Figure 14:
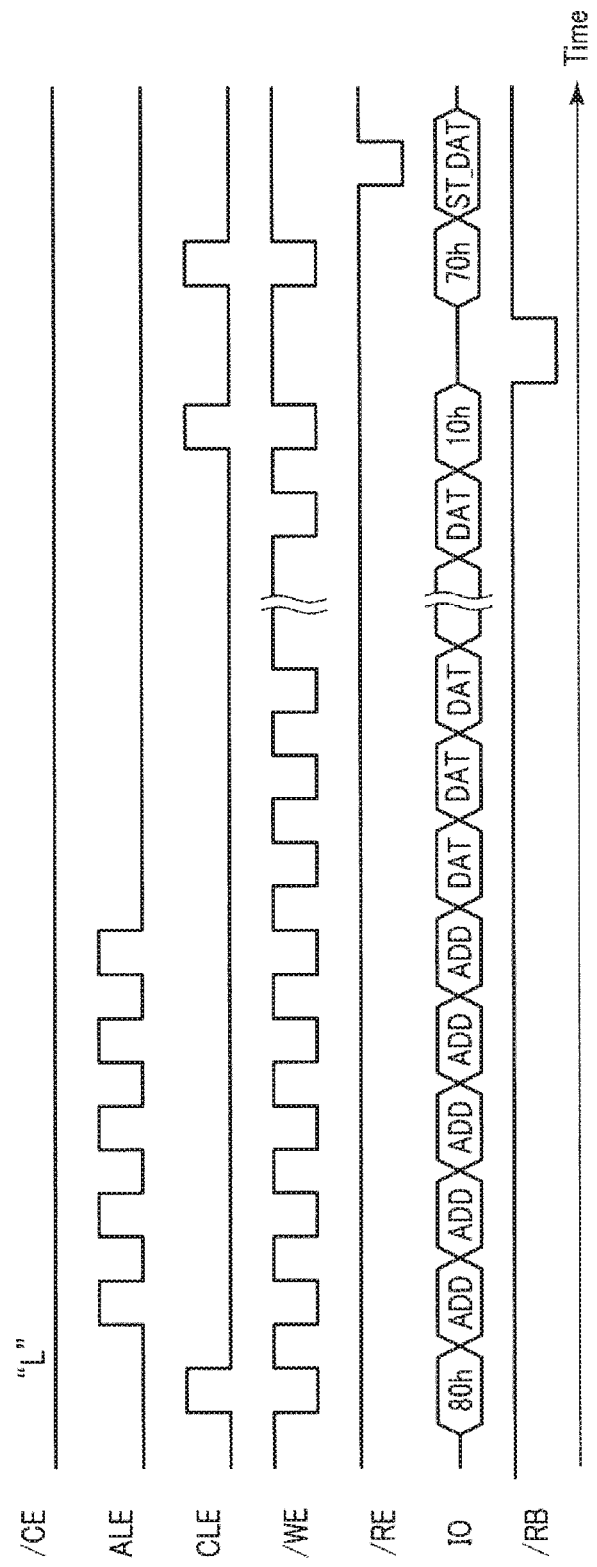

FIG. 14 is a timing chart of various signals on the NAND buses during execution of the step (2). After the second write command CMD_WR2 is received in the controller 200, the NAND interface circuit 230 issues a write command "80h", for example, under the control of the sequencer 250, and transmits the command to the NAND-type flash memory 100. Subsequently, an address ADD is transmitted to the NAND-type flash memory 100, for example, for 5 clock cycles, and data to be written DAT are transmitted to the NAND-type flash memory 100 for a plurality of clock cycles. Then, a write command "10h" is issued and is transmitted to the NAND-type flash memory 100. The address ADD includes addresses indicating a block, a page, and a column, held in the address register 290 in the operations illustrated in FIGS. 12 and 13.

An operation of writing the data to the memory cell array 110 is started in the NAND-type flash memory 100 in response to the command "10h", and thus the NAND-type flash memory 100 is brought into a busy state (/RB="L").

If writing of the data to the memory cell array 110 is completed, the NAND-type flash memory 100 is brought into a ready state. The controller 200 reads a status, issues a command "70h", and toggles the signal /RE, in response thereto. Then, status data ST_DAT indicating whether the writing operation is passed or failed is transmitted to the controller 200 in synchronization with the signal /RE. The status data ST_DAT is held in the feature table, and is read to the host apparatus 500 in response to the Get feature command in the step (3).

1.2.3 Erasing Operation

Next, the erasing operation will be described. The erasing operation includes the following two steps.

(1) An erase (delete) command is issued from the host apparatus 500 to the controller 200.

(2) Feature table reading (Get feature): Through this step, whether the erasing operation on the NAND-type flash memory 100 is passed or failed is determined.

Figure 15:
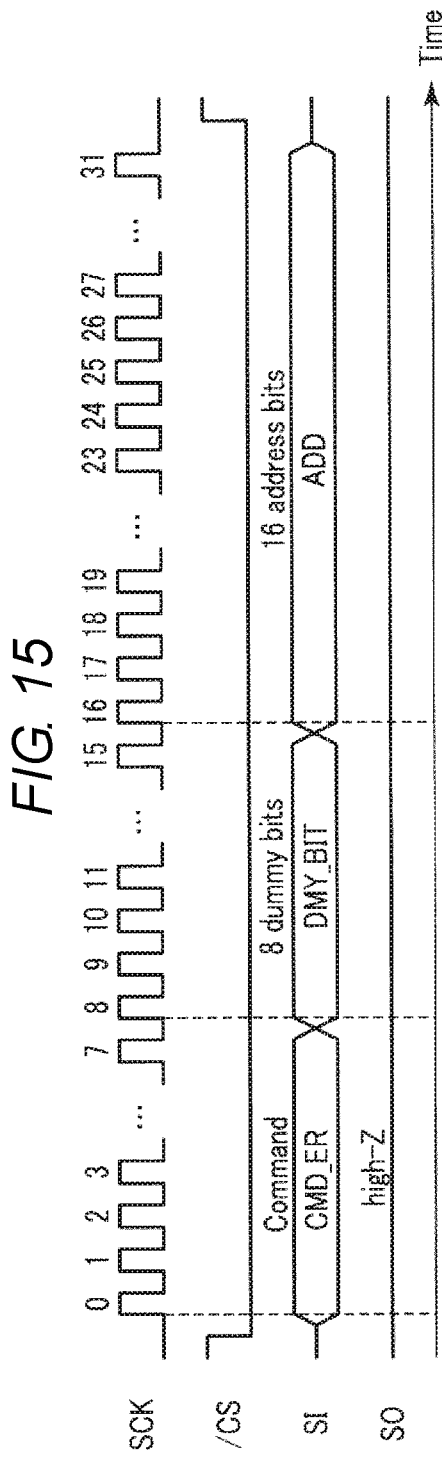
FIGS. 15-16 are timing charts of various signals during erasing of data in the memory system according to the first embodiment.

FIG. 15 is a timing chart of various signals on the SPI buses during execution of the step (1). As illustrated, the host apparatus 500 asserts the signal /CS, issues an erase command CMD_ER as the signal SI, and also issues the clock SCK. If the erase command CMD_ER is received, the sequencer 250 starts a data erasure sequence.

Next, the host apparatus 500 transmits 8 dummy bits DMY_BIT to the controller 200, for example, for 8 clock cycles, and then transmits a 16-bit address ADD to the controller 200, for example, for 16 clock cycles. The address ADD designates an erasure target block in the memory cell array 110, and is held in the address register 290. Subsequently, the host apparatus 500 deasserts the signal/CS.

The step (2) is performed following the step (1). A command sequence in this operation is the same as in FIG. 9 referred to for description of the reading operation. If the received status data ST_DAT indicates that the memory system 1 is in a ready state, the host apparatus 500 subsequently makes a request for information indicating whether erasure of the data is passed or failed.

Figure 16:
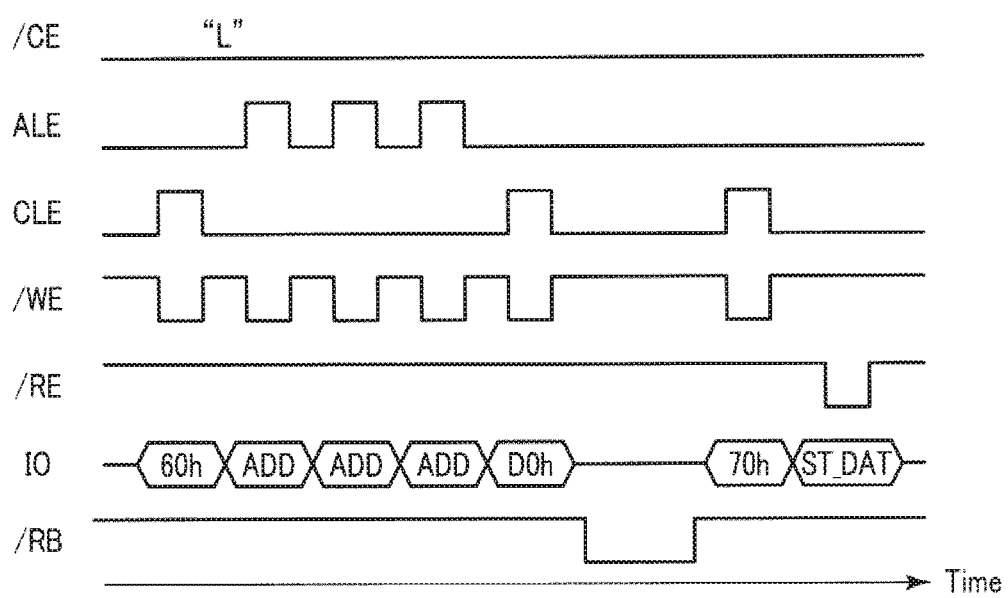

FIG. 16 is a timing chart of various signals on the NAND buses during execution of the step (1). After the erase command CMD_ER is received in the controller 200, the NAND interface circuit 230 issues an erase command "60h", for example, under the control of the sequencer 250, and transmits the command to the NAND-type flash memory 100. Subsequently, an address ADD is transmitted to the NAND-type flash memory 100, for example, for 3 clock cycles, and then an erase command "D0h" is issued and is transmitted to the NAND-type flash memory 100.

An operation of erasing data from the memory cell array 110 is started in the NAND-type flash memory 100 in response to the command "D0h", and thus the NAND-type flash memory 100 is brought into a busy state (/RB="L").

If erasing of the data from the memory cell array 110 is completed, the NAND-type flash memory 100 is brought into a ready state. The controller 200 issues a status read command "70h", and toggles the signal /RE, in response thereto. Then, status data ST_DAT indicating whether the erasing operation is passed or failed is transmitted to the controller 200 in synchronization with the signal /RE. The status data ST_DAT is held in the feature table, and is read to the host apparatus 500 in response to the Get feature command during the step (2).

1.3 Operation During Booting of Host Apparatus

The host apparatus 500 according to the present embodiment reads a boot program from the NAND-type flash memory 100 when power is supplied thereto, and is booted according to the boot program. Hereinafter, booting of the host apparatus 500 will be described.

1.3.1 Boot Program

Figure 17:
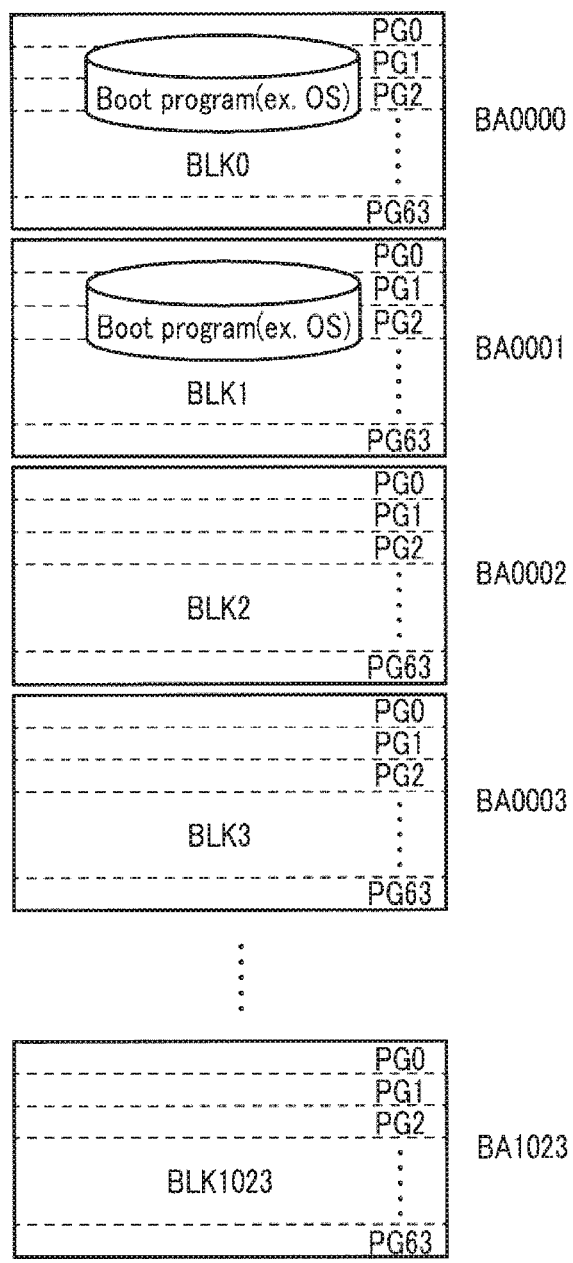
FIG. 17 is a block diagram of a memory cell array according to the first embodiment.

First, the boot program held in the NAND-type flash memory 100 will be described. FIG. 17 is a block diagram of the memory cell array 110.

As illustrated, the memory cell array 110 is provided with, for example, 1024 blocks BLK (BLK0 to BLK1023). The number of pages included in each block BLK is, for example, 64 (PG0 to PG63). The respective blocks BLK0 to BLK1023 are respectively allocated with block addresses (physical addresses) "BA0000" to "BA1023". The pages PG0 to PG63 are respectively allocated with page addresses (physical addresses) "PA0" to "PA63", and each page is allocated with column addresses (physical addresses) "CA0" to "CA". The host apparatus 500 accesses the memory system 1 by using the addresses.

The boot program of the host apparatus 500 is held in the block BLK0 and the block BLK1 among the 1024 blocks BLK. The boot program may be, for example, an operating system which is executed by the host apparatus 500.

The same boot program is held in the block BLK0 and the block BLK1. In other words, the boot program is held in a plurality of blocks BLK in a redundant manner in the memory cell array 110.

1.3.2 Flow of Operation During Booting of Host Apparatus

Figures 18, 19:
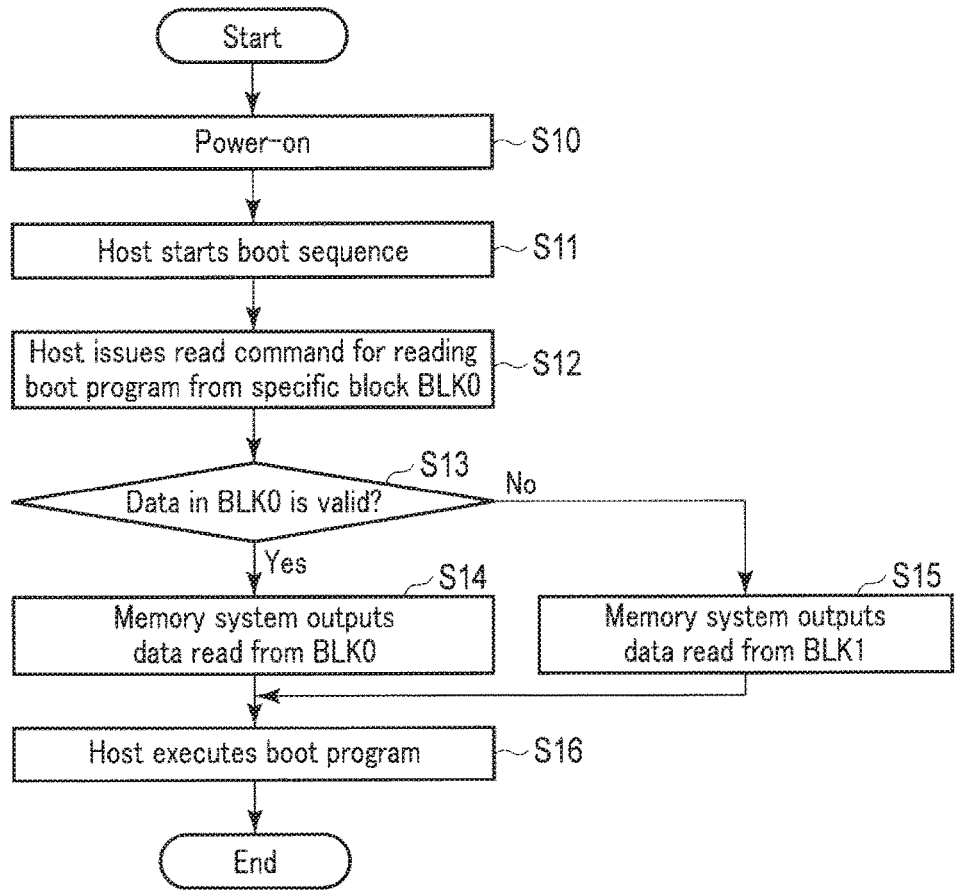
FIG. 18 is a flowchart illustrating an operation during booting of an application in the memory system according to the first embodiment.
FIG. 19 is a schematic diagram of a feature table according to a second embodiment.

Next, with reference to FIG. 18, a flow of an operation during booting of the host apparatus 500 will be described.

As illustrated, if power is supplied to the host apparatus 500 and the memory system 1 (step S10), the host apparatus 500 starts a boot sequence stored in, for example, a ROM thereof (step S11).

Then, the host apparatus 500 issues a read command for reading the boot program from the block BLK0 to the memory system 1 (step S12). In the present embodiment, the host apparatus 500 and the memory system 1 are set in advance such that the boot program is stored in the block BLK0, and the host apparatus 500 first accesses the block BLK0. However, the boot program is not necessarily stored in the block BLK0 and may be stored in other blocks.

The memory system 1 which receives the read command issued in step S12 determines whether or not the boot program in the block BLK0 is valid (step S13). If the valid boot program is held in the block BLK0 (YES in step S13), the memory system 1 transmits the boot program read from the block BLK0 to the host apparatus 500 (step S14). On the other hand, if the valid boot program is not held in the block BLK0 (NO in step S13), the memory system 1 transmits a boot program read from, not the block BLK0, but the block BLK1, to the host apparatus 500 (step S15).

The host apparatus 500 executes the boot program received from the memory system 1 (step S16). Consequently, the host apparatus 500 is booted, and an application including the host apparatus 500 and the memory system 1 start operations thereof.

1.4 Advantage of Present Embodiment

According to the present embodiment, operation reliability of the memory system 1 can be improved. The advantage will be described below in detail.

If a program (software) for system control is held in a NAND-type flash memory of a system including the host apparatus and the NAND-type flash memory, the software is read from the NAND-type flash memory during booting of the system. At this time, the host apparatus which controls the NAND-type flash memory reads the data (software) from a predefined specific block.

On the other hand, when a plurality of reading operations is performed on the NAND-type flash memory, data held in the memory cell thereof may be damaged due to characteristics thereof. During writing or erasing of data, defects may occur in a block, and thus the data may not be read from the block.

In view of this, according to the present embodiment, the boot program (the program for system control) is held not only in the block BLK0 but also in the block BLK1. If data in the block BLK0 is damaged, or data cannot be read from the block BLK0, the boot program is read from the block BLK1. Therefore, even if the boot program in the block BLK0 cannot be used, the host apparatus 500 can be booted by using the boot program in the block BLK1. As a result, a problem that the host apparatus 500 cannot be booted can be reduced.

If data in the block BLK0 is damaged, or data cannot be read from the block BLK0, the memory system 1 according to the present embodiment voluntarily reads the boot program in the block BLK1 and transmits the boot program to the host apparatus 500, without being triggered by a read command for reading the boot program from the block BLK1 that is received from the host apparatus 500. As a result, the host apparatus 500 is not required to determine whether or not the boot program in the block BLK0 is invalid and to transmit a read command for the block BLK1 if the boot program is invalid, and thus a boot sequence for the host apparatus 500 can be simplified.

2. Second Embodiment

Next, a memory system according to a second embodiment will be described. In the present embodiment, the operation according to the first embodiment described with reference to FIG. 18 is carried out employing an ECC process result for the determination in step S13. Hereinafter, only a difference from the first embodiment will be described.

2.1 Feature Table

First, the concept of a feature table will be described with reference to FIG. 19. As illustrated, the feature table includes a single entry, and the entry has an 8-bit length. The entry is allocated with an address "C0h".

The following information is allocated to the entry related to the address "C0h" from the lowest bit in order.

Bit 0=operation in progress (OIP): This bit is a flag indicating whether the memory system 1 is in a ready state or a busy state, and indicating the ready state with "0" and the busy state with "1"

Bit 1=write enable latch (WEL): This bit is a flag indicating whether writing of data is enabled or disabled, and indicating disable with "0" and enable with "1".

Bit 2=erase fail (ERS_F): This bit is a flag indicating whether or not a data erasing operation is failed, and indicating pass with "0" and fail with "1".

Bit 3=program fail (PRG_F): This bit is a flag indicating whether or not a data programming operation is failed, and indicating pass with "0" and fail with "1"

Bits 4 and 5=ECC status (ECCS): These bits indicate an error correction result in the NAND-type flash memory 100, in which "00" indicates that no error is detected, "01" and "11" indicate that an error is corrected, and "10" indicates that an error cannot be corrected. Regarding a difference between "01" and "11", "01" indicates that the number of error bits is less than a preset threshold value, and "11" indicates that the number of corrected error bits is equal to or more than the preset threshold value.

Bits 6 and 7=reserved

The feature table is generated by, for example, the sequencer 250, based on information provided from the NAND interface circuit 230 or the host interface circuit 220, and is held in, for example, the status register 280.

2.2 First Example

Figure 20:
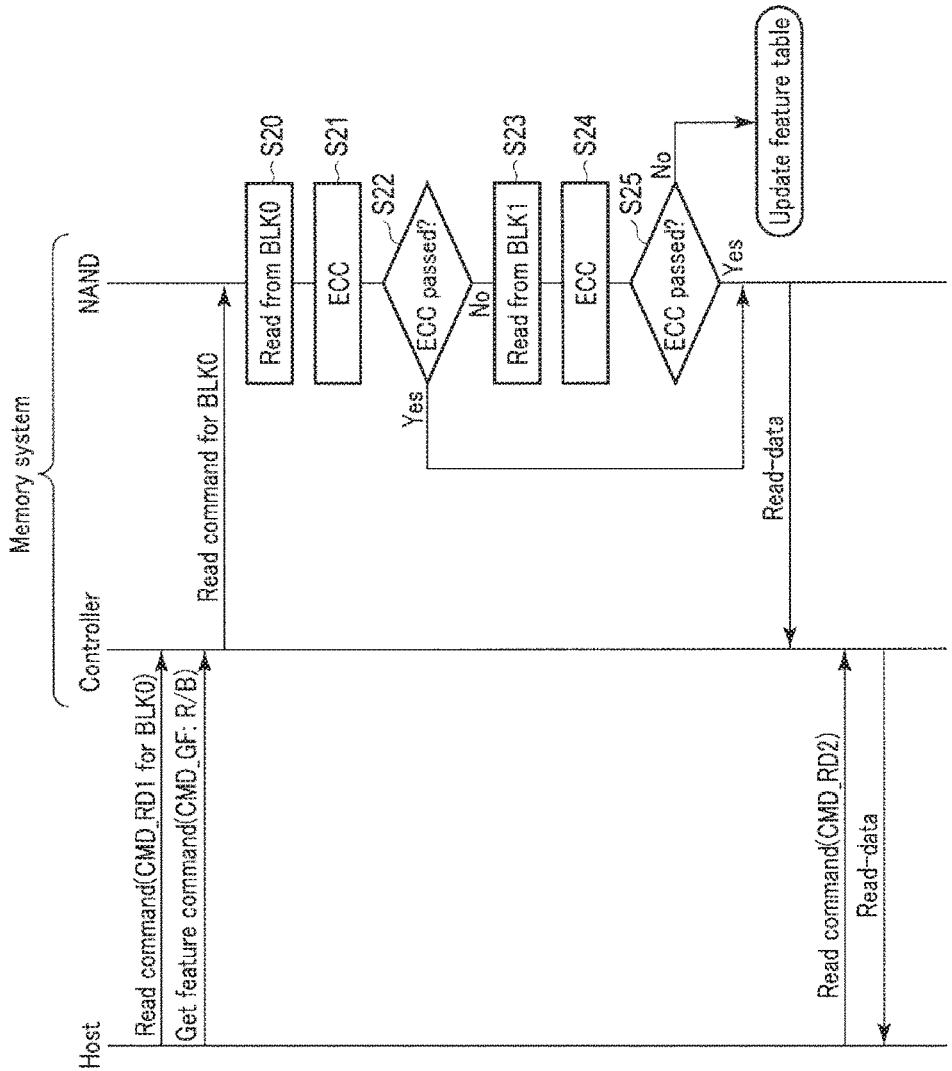
FIG. 20 is a flowchart illustrating a reading operation in the memory system according to the second embodiment.
Figure 21:
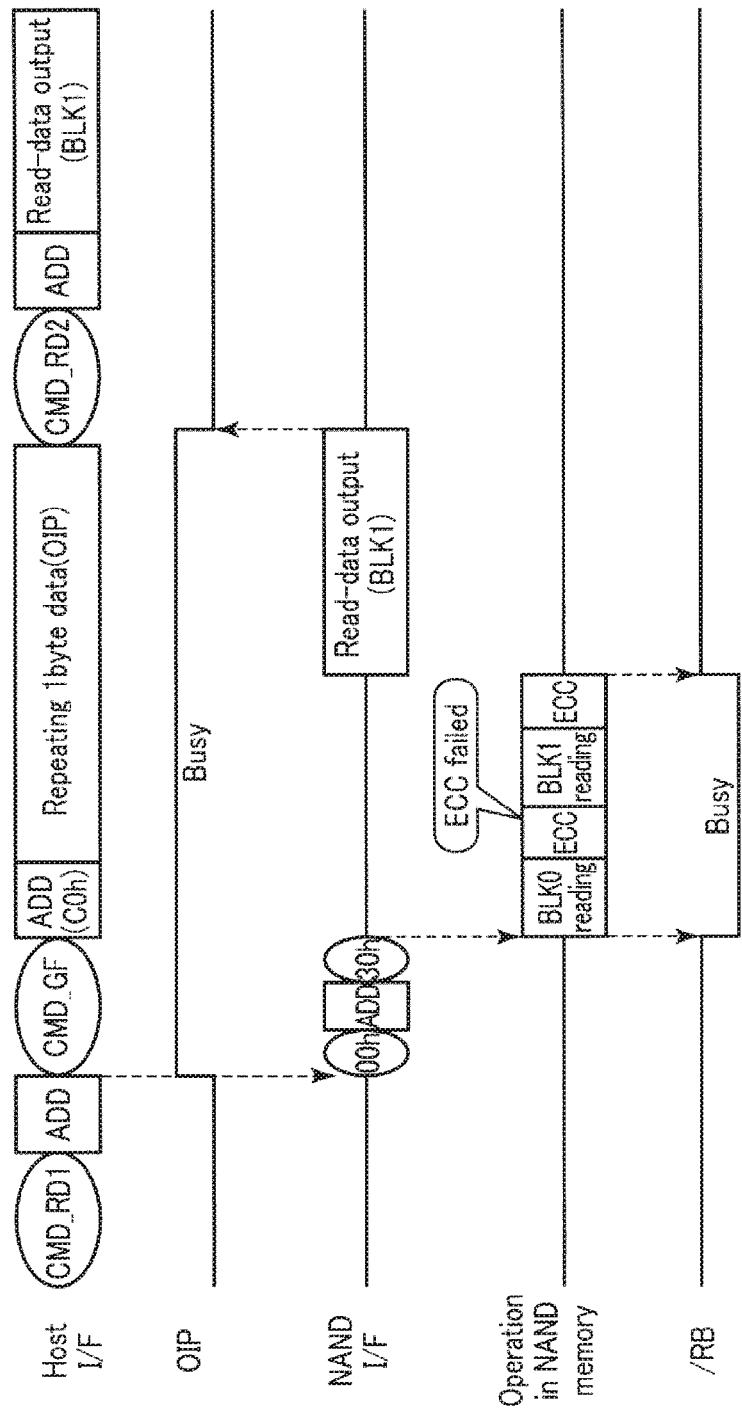
FIG. 21 illustrates command sequence during the reading operation in the memory system according to the second embodiment.

With reference to FIGS. 20 and 21, a first example of the boot sequence according to the first embodiment will be described. FIG. 20 is a flowchart illustrating operations of the host apparatus 500, the controller 200, and the NAND-type flash memory 100 during a reading operation, and FIG. 21 illustrates a command sequence. FIG. 21 illustrates, as a specific example, a case where the boot program read from the block BLK1 is transmitted to the host apparatus 500. Details of operations during the reading operation are the same as the operations described with reference to FIGS. 8 to 11, and thus description thereof will be omitted.

As illustrated, first, the host apparatus 500 issues the first read command CMD_RD1, and then an address ADD. The address ADD is used to designate the block BLK0 of the NAND-type flash memory 100, and also the page PG0 in the block BLK0. In response to the address, the memory system 1 is brought into a busy state, and the OIP in the feature table becomes "1". The host apparatus 500 issues the Get feature command CMD_GF and the address ADD (="C0h"), and reads information (1-byte data) regarding the entry including the OIP from the feature table. The entry information is repeatedly transmitted to the host apparatus 500 until the OIP becomes "0" (the Get feature command may be repeatedly issued) in a period in which the clock SCK is input.

When the memory system 1 is brought into a busy state, the controller 200 issues a command "00h", an address ADD, and a command "30h" to the NAND-type flash memory 100. In response to the command "30h", the NAND-type flash memory 100 is brought into a busy state. The address ADD output from the controller 200 designates the block BLK0, and the page PG0 and the column CA0 (a leading column in the page) in the block BLK0.

In the NAND-type flash memory 100, data are read from the block BLK0 of the memory cell array 110 (step S20). Subsequently, the ECC circuit 400 performs error detection on the read data (boot program) (step S21).

If an error is detected and cannot be corrected in step S21 (NO in step S22), the control circuit 440 reads data from the block BLK1 allocated with the next address "BA0001" of the block address "BA0000" of the block BLK0 (step S23). In the reading operation, particularly, a command from the controller 200 is not necessary, and the NAND-type flash memory 100 voluntarily performs the operation. The ECC circuit 400 performs error detection on the data read from the block BLK1 (step S24).

If an error is detected and cannot be corrected in step S24 (step S25), uncorrected data are output. In this case, information indicating that error correction on the block BLK0 and the block BLK1 is invalid is held in, for example, the feature table. The host apparatus can read the information by using, for example, the Get feature command.

If no error is detected in step S21 or an error is detected but is corrected in step S21 (YES in step S22), or if no error is detected in step S24 or an error is detected but is corrected in step S24 (YES in step S25), the NAND-type flash memory 100 is brought into a ready state, and the data read from the block BLK0 or the block BLK1 is transmitted to the controller 200.

If the controller 200 receives the data from the NAND-type flash memory 100, the memory system 1 is brought into a ready state, and, for example, the sequencer 250 sets the OIP "1" in the feature table as "0".

In response to the OIP becoming "0", the host apparatus 500 issues the second read command CMD_RD2, and reads the data read from the block BLK0 or the block BLK1, from the controller 200.

2.3 Second Example

Figure 22:
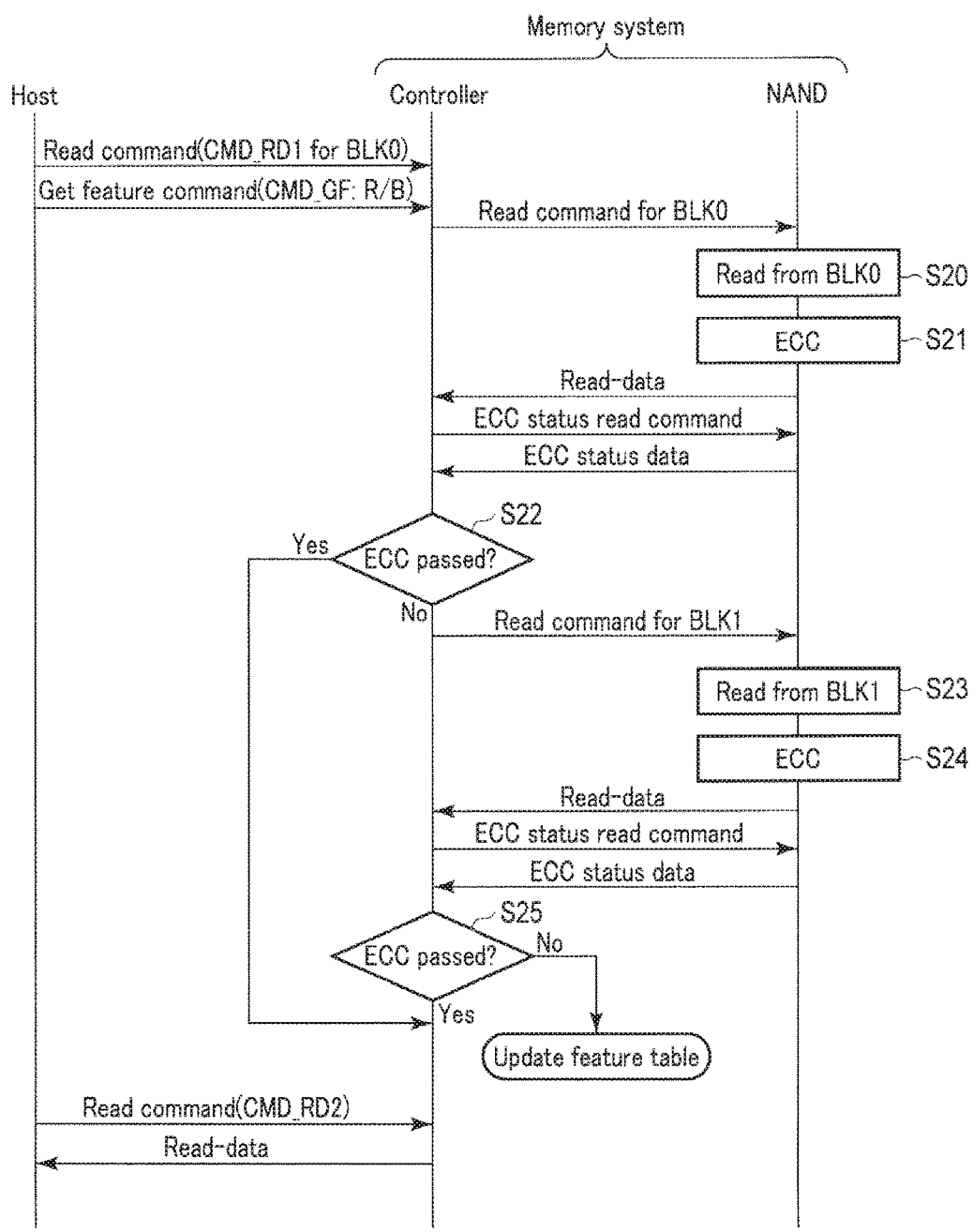
FIG. 22 is a flowchart illustrating another reading operation in the memory system according to the second embodiment.
Figure 23:
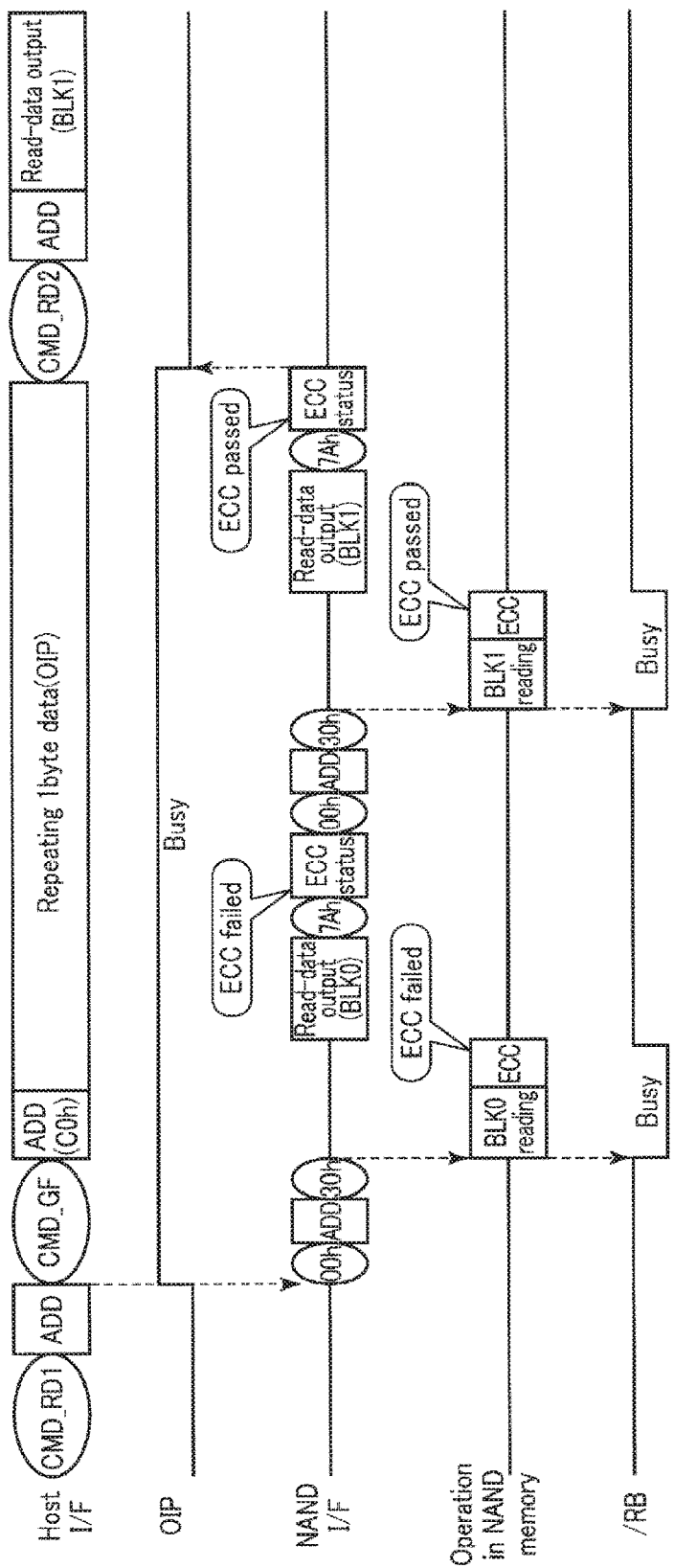
FIG. 23 illustrates command sequence during the reading operation shown in FIG. 22.

Next, a second example will be described with reference to FIGS. 22 and 23. FIG. 22 is a flowchart illustrating operations of the host apparatus 500, the controller 200, and the NAND-type flash memory 100 during a reading operation, and FIG. 23 illustrates a command sequence. FIG. 23 illustrates, as a specific example, a case where the boot program read from the block BLK1 is transmitted to the host apparatus 500. A difference between the first and second examples is that the controller 200 determines an ECC process result and issues an access command for the block BLK1 in the second example. Hereinafter, only a difference from the first example will be described.

The host apparatus 500 issues the first read command CMD_RD1 along with the address ADD for designating the block BLK0, and thus a reading operation is performed on the block BLK0, similarly to the first example.

Then, in the present embodiment, if an ECC process is completed in the ECC circuit 400, and thus the NAND-type flash memory 100 is brought into a ready state, the controller 200 toggles the signal /RE, and first reads the data from the block BLK0, from the NAND-type flash memory 100. Subsequently, the sequencer 250 issues a command "7Ah", and transmits the command to the NAND-type flash memory 100. The command "7Ah" is a command for reading an ECC process result (hereinafter, referred to as ECC status data) from the NAND-type flash memory 100, and, for example, information regarding the number of error bits in each sector is obtained.

The controller 200 determines whether or not the data read from the block BLK0 is accurate data based on the ECC status data read from the NAND-type flash memory 100 (step S22). This determination may be performed by the ECC circuit checking, for example, whether or not error bits which are actually generated exceeds the number of error correctable bits.

If accurate data are not read, that is, an error cannot be corrected (NO in step S22), the sequencer 250 issues the command "00h" again, issues the next addresses "BA0001", "PA00", and "CA00" of the block address "BA0000", "PA00", and "CA00", and also issues the command "30h". Consequently, the NAND-type flash memory 100 is brought into a busy state again, and data are read from the block BLK1 (step S23).

Then, similarly to the first example, the data read from the block BLK1 is transmitted to the controller 200, and ECC status data regarding the data read from the block BLK1 is further transmitted to the controller 200. If the data read from the block BLK1 is accurate data (YES in step S25), or the data read from the block BLK0 is accurate data (YES in step S22), the host apparatus 500 issues the second read command CMD_RD2, and reads the data read from the block BLK0 or the block BLK1, from the controller 200.

2.4 Advantage of Present Embodiment

The configuration described in the first embodiment can be achieved by the present embodiment. That is, if an error of data read from the block BLK0 cannot be corrected, it is determined that the data in the block BLK0 is invalid as in step S13 in the first embodiment. In this case, data are read from the block BLK1.

When the data are read from the block BLK1, the NAND-type flash memory 100 may determine whether or not an error of the data in the block BLK0 cannot be corrected, and may voluntarily read the data from the block BLK1 without waiting for a command from the controller 200. Of course, as in the second example, the controller 200 may determine whether the data in the block BLK0 is valid or invalid, and may issue a read command for the block BLK1 based on a result of the determination.

In the example illustrated in FIG. 23, the command "7Ah" is issued after the data in the block BLK0 or the block BLK1 is transmitted to the controller 200. However, before the data are transmitted to the controller 200, the command "7Ah" may be issued, and whether the data are valid or invalid may be determined. If the data are determined to be valid, the controller 200 may read the data from the NAND-type flash memory 100, and if the data are determined to be invalid, the controller 200 may not read the data. This is because the invalid data are not also necessary in the controller 200.

3. Third Embodiment

Next, a memory system according to a third embodiment will be described. In the present embodiment, bad block information is used for the determination in step S13. Hereinafter, only a difference from the second embodiment will be described.

3.1 Bad Block Information

First, with reference to FIG. 24, bad block information according to the present embodiment will be described.

In the NAND-type flash memory 100, a block BLK which includes a defective cell and is thus determined as not being accessed is registered as a bad block. If the block BLK is registered as the bad block, access to the block BLK is inhibited thereafter. Information regarding the bad block (for example, a block address of the block BLK registered as the bad block) is held in any one of areas of the NAND-type memory cell array 110.

The bad block includes an inherent bad block and an acquired bad block. The inherent bad block is a block found to be a bad block through a test before product shipment. Information regarding the inherent bad block is stored in, for example, a ROM fuse area of the memory cell array 110, and is voluntarily read by, for example, the control circuit 440 when powered on. In addition, a flag is set in the row decoder 120 corresponding to the bad block. Consequently, access to the bad block is inhibited.

In contrast, the acquired bad block is a block which is registered as a bad block due to a defect generated after product shipment. For example, if a writing operation is failed, or an erasing operation is failed, a corresponding block is regarded as a bad block thereafter. Information regarding the acquired bad block is also stored in a specific area of the memory cell array 110. This information is read by, for example, the controller 200, and the acquired bad block is managed by the controller 200 after the system is booted.

Figure 24:
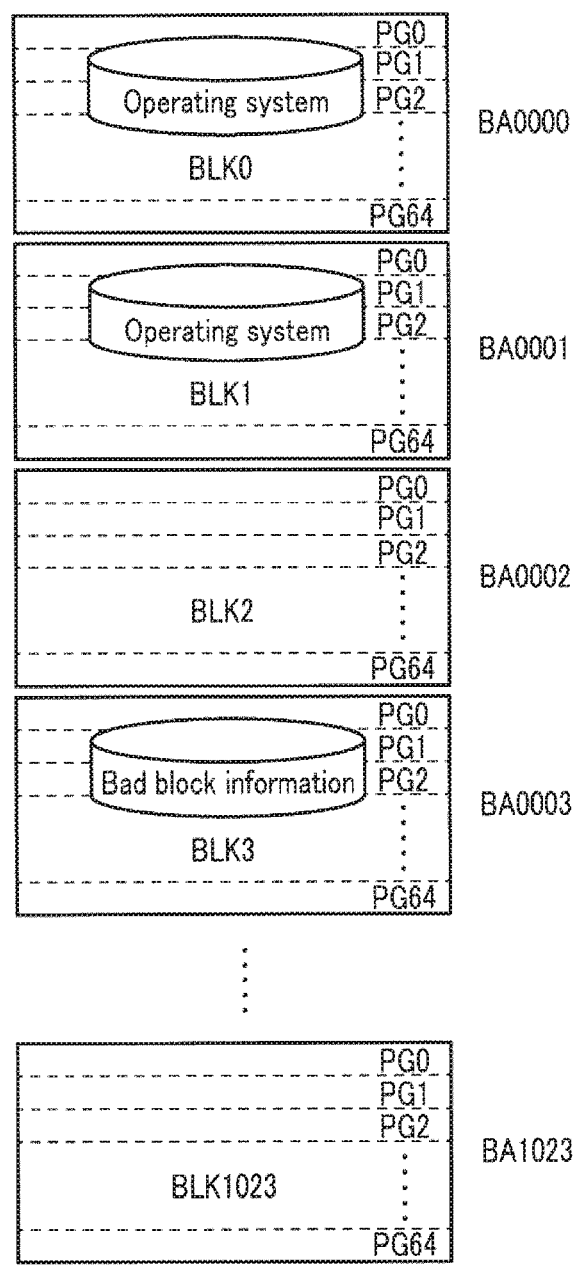
FIG. 24 is a block diagram of a memory cell array according to a third embodiment.

In the present embodiment, as illustrated in FIG. 24, the information regarding the acquired bad block is held in the block BLK3 which is different from the ROM fuse area. In the following description, the "bad block information" indicates information regarding an acquired bad block unless otherwise specified.

3.2 First Example

Figure 25:
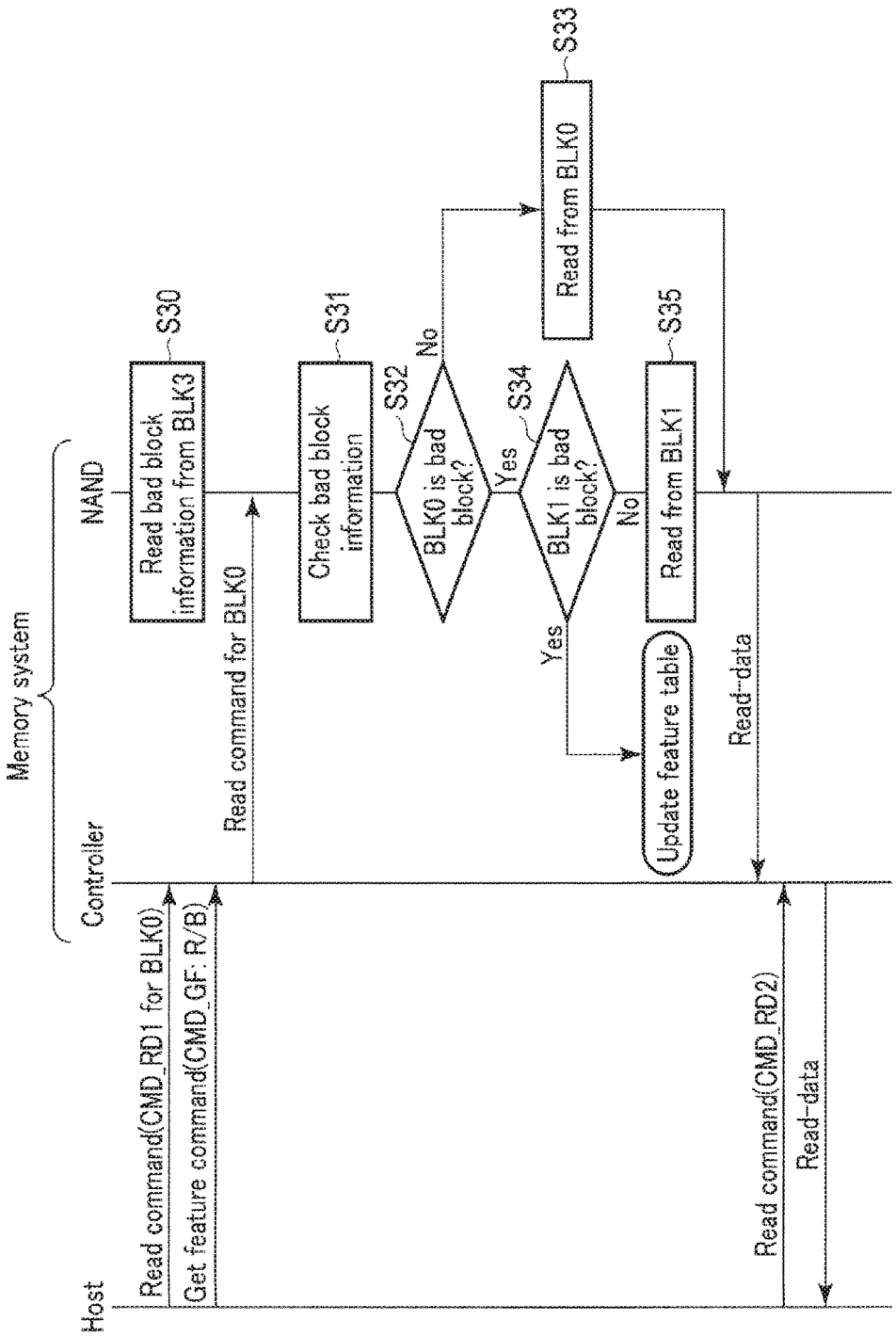
FIG. 25 is a flowchart illustrating a reading operation in the memory system according to the third embodiment.

With reference to FIG. 25, a first example of the present embodiment will be described. FIG. 25 is a flowchart illustrating operations of the host apparatus 500, the controller 200, and the NAND-type flash memory 100 during a reading operation.

As illustrated, after power is supplied, and data in the ROM fuse area is set in various registers, the NAND-type flash memory 100 voluntarily reads the bad block information from the block BLK3 without receiving a command from the controller 200 (step S30). The bad block information is held in a register such as the status register 410.

Next, a boot program is read from the memory system 1 by the host apparatus 500. In other words, as described in the second embodiment, the host apparatus 500 issues the first read command CMD_RD1, and then an address ADD. The address ADD is used to designate the block BLK0 of the NAND-type flash memory 100, and also the page PG0 in the block BLK0. Then, the memory system 1 is brought into a busy state, and the OIP in the feature table becomes "1".

When the memory system 1 is brought into a busy state, the controller 200 issues a command "00h", an address ADD, and a command "30h" to the NAND-type flash memory 100. As a result, the NAND-type flash memory 100 is brought into a busy state. The address ADD output from the controller 200 is the address "BA0000" for designating the block BLK0, and the page PG0 and the column CA0 in the block BLK0.

Then, the control circuit 440 checks whether or not the block BLK0 is a bad block by referring to the bad block information in the status register 410 (step S31). If the block BLK0 is not a bad block (NO in step S32), the control circuit 440 continuously executes the sequence of reading data from the block BLK0, and then the data are read from the block BLK0 (step S33).

On the other hand, if the block BLK0 is a bad block (YES in step S32), the control circuit 440 checks whether or not the block BLK1 is a bad block (step S34). If the block BLK1 is not a bad block (NO in step S34), the control circuit 440 changes a block to be activated from the block BLK0 to the block BLK1 and continuously executes the reading sequence. As a result, data are read from the block BLK1 (step S35).

If both of the block BLK0 and the block BLK1 are bad blocks (YES in steps S32 and S34), the booting operation is failed and completed. Information indicating that the booting operation is failed is stored in the feature table, and the host apparatus 500 can obtain the information by using the Get feature command.

Thereafter, the data read from the block BLK0 or the block BLK1 is transmitted to the controller 200, and the data are subsequently transmitted to the host apparatus 500 as described in the second embodiment.

3.3 Second Example

Figure 26:
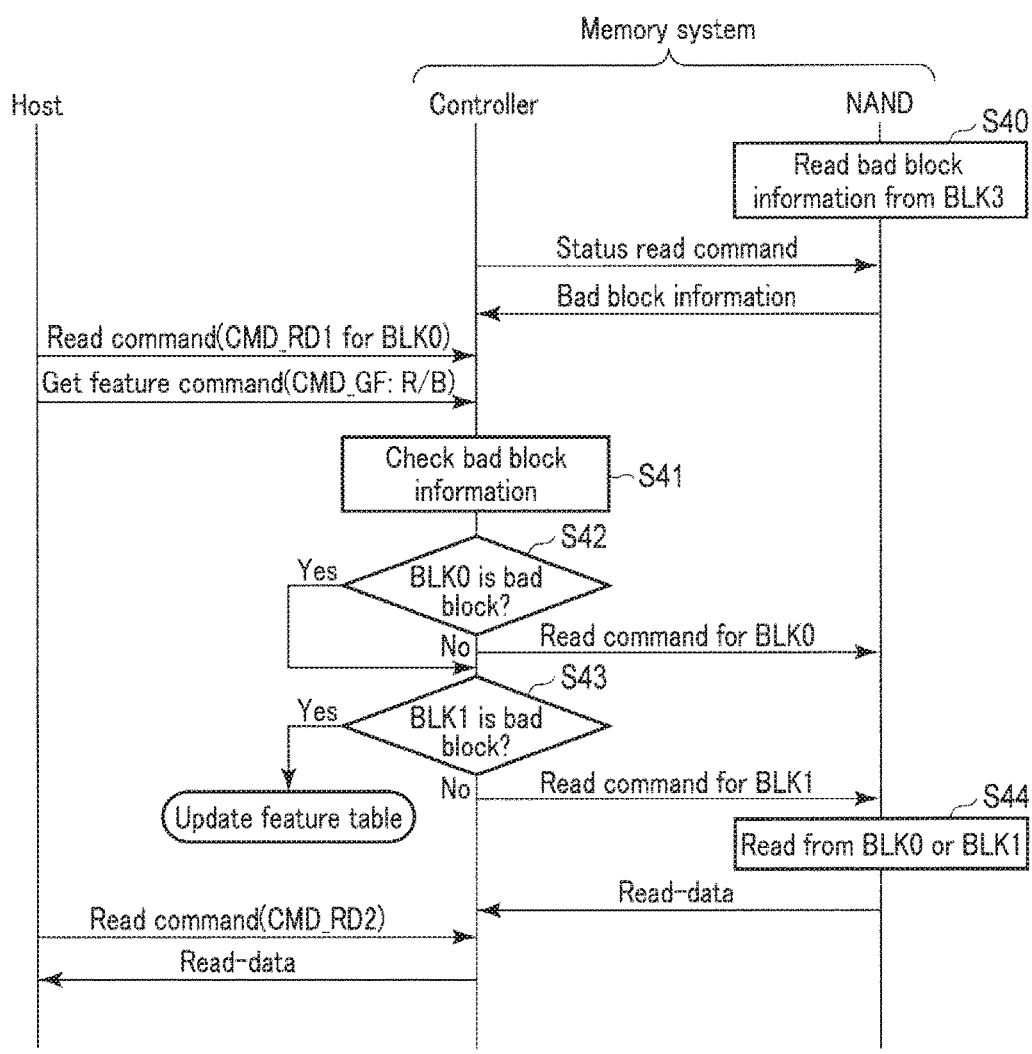
FIG. 26 is a flowchart illustrating another reading operation in the memory system according to the third embodiment.

Next, a second example will be described with reference to FIG. 26. FIG. 26 is a flowchart illustrating operations of the host apparatus 500, the controller 200, and the NAND-type flash memory 100 during a reading operation. A difference between the first and second examples is that the controller 200 determines whether or not the block BLK0 and block BLK1 are bad blocks in the second example. Hereinafter, only a difference from the first example will be described.

As illustrated, the NAND-type flash memory 100 reads the bad block information from the block BLK3 in the same manner as in the first example (step S40). Next, the controller 200 issues, for example, a status read command so as to read the bad block information held in the status register 410 or the like, and holds the bad block information in, for example, the status register 280. The status register 280 may hold inherent bad block information read from the ROM fuse area. This is also the same for the first example.

Subsequently, the boot program is read from the memory system 1 by the host apparatus 500. In the present embodiment, if the first read command CMD_RD1 and the address ADD are received from the host apparatus 500, the sequencer 250 of the controller 200 refers to the bad block information in the status register 280 (step S41). Consequently, the sequencer 250 determines whether or not the block BLK0 is a bad block.

If the block BLK0 is not a bad block (NO in step S42), the controller 200 issues a read command, and an address for designating the block BLK0, the page PG0, and the column CA0 to the NAND-type flash memory 100, and transmits the command and the address to the NAND-type flash memory 100.

If the block BLK0 is a bad block (YES in step S42), the sequencer 250 determines whether or not the block BLK1 is a bad block (step S43).

If the block BLK1 is not a bad block (NO in step S43), the controller 200 issues a read command, and an address for designating the block BLK1, the page PG0, and the column CA0 to the NAND-type flash memory 100, and transmits the command and the address to the NAND-type flash memory 100.

The NAND-type flash memory 100 reads data from the block BLK0 or the block BLK1 based on the received read command and address (step S44).

3.4 Advantage of Present Embodiment

The configuration described in the first embodiment can also be achieved by the present embodiment. That is, the bad block information is read from the memory cell array 110, and whether data are valid or invalid can be determined based on the information. The determination may be performed by the NAND-type flash memory 100 in the same manner as in the first example, and may be performed by the controller 200 in the same manner as in the second example.

In the first and second examples, the bad block information is read in the memory system 1 before a read command of the boot program is received from the host apparatus 500. However, for example, the bad block information may be read in response to the read command of the boot program from the host apparatus 500. Not only inherent bad block information but also acquired bad block information may be held in the ROM fuse area if possible. An address of the memory cell array designated by the controller 200 may be used to designate pages and columns other than the page PG0 and the column CA0.

4. Fourth Embodiment

Next, a memory system according to a fourth embodiment will be described. The present embodiment relates to a method of writing the boot program into the block BLK0 and the block BLK1 in the first to third embodiments. Hereinafter, only a difference from the first to third embodiments will be described. Details of a writing operation are the same as those described with reference to FIGS. 12 to 14 in the first embodiment, and thus repeated description will be omitted.

4.1 First Example

In a first example, the sequences described with reference to FIGS. 12 to 14 are repeatedly performed in each writing operation on the block BLK0 and the block BLK1 in the first embodiment.

Figure 27:
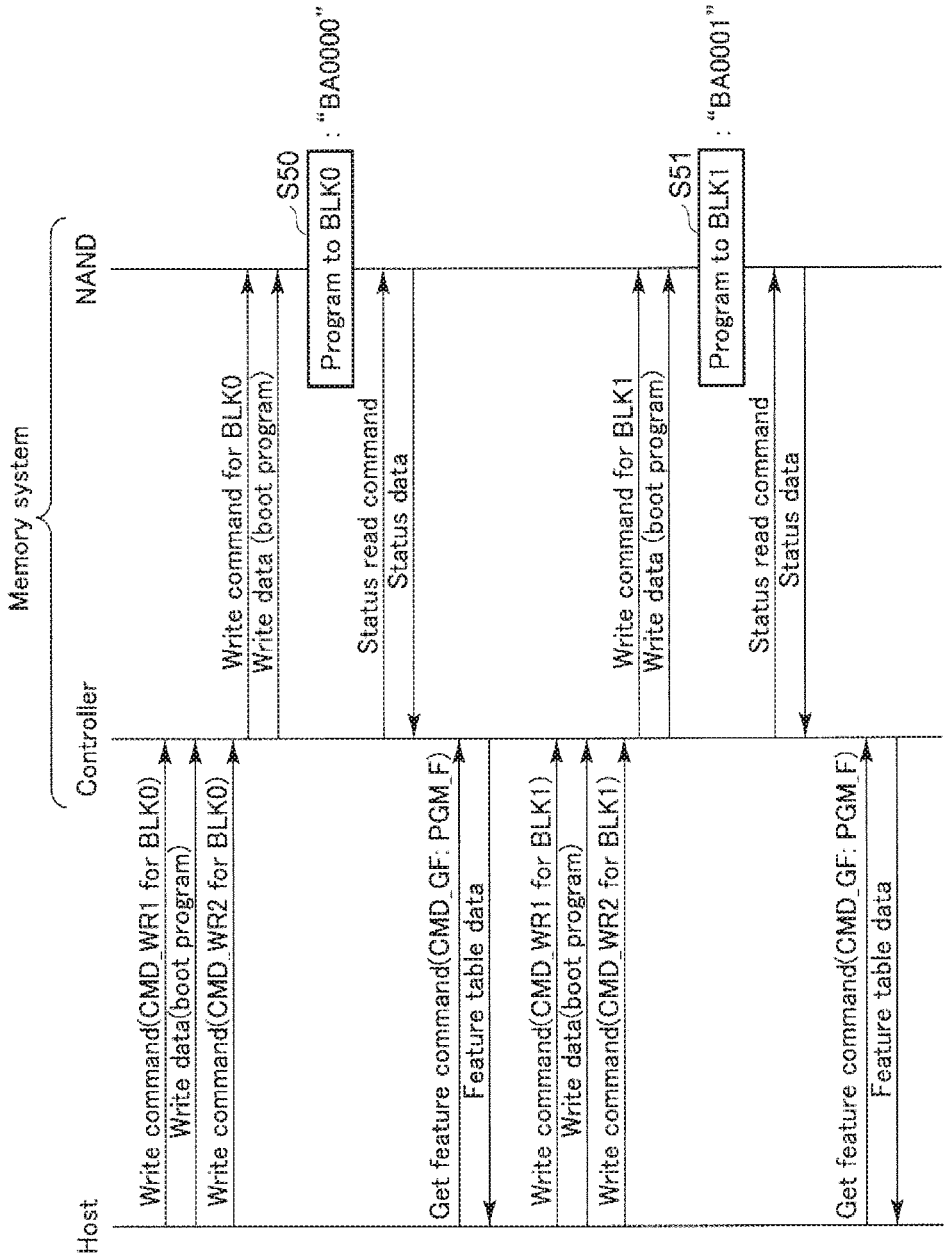
FIG. 27 is a flowchart illustrating a writing operation in a memory system according to a fourth embodiment.

FIG. 27 is a flowchart illustrating operations of the host apparatus 500, the controller 200, and the NAND-type flash memory 100 during writing of the boot program.

As illustrated, first, the host apparatus 500 issues the first write command CMD_WR1, and then an address ADD. The address ADD is used to designate the block BLK0, and the page PG0 in the block BLK0 of the NAND-type flash memory 100. Next, the host apparatus 500 transmits data to be written ("write data") (boot program) to the memory system 1, and also issues the second write command CMD_WR2.

Then, in the memory system 1, a write command, and thus the boot program is written into the block BLK0 (step S50). The host apparatus 500 issues the Get feature command, and checks whether or not writing of the boot program into the block BLK0 is successful by referring to the flag PRG_F in the feature table. This sequence is repeatedly performed on each page PG in the block BLK0, and writing of the boot program into the block BLK0 is completed.

Next, the host apparatus 500 issues the first write command CMD_WR1 and an address ADD. The address ADD is used to designate the block BLK1, and the page PG0 in the block BLK1. Next, the host apparatus 500 transmits write data (boot program) to the memory system 1, and also issues the second write command CMD_WR2.

Then, in the memory system 1, a write command, and then the boot program is written into the block BLK1 (step S51). The host apparatus 500 issues the Get feature command, and checks whether or not writing of the boot program into the block BLK1 is successful by referring to the flag PRG_F in the feature table. This sequence is repeatedly performed on each page PG in the block BLK1, and writing of the boot program into the block BLK1 is completed.

4.2 Second Example

Next, a second example will be described with reference to FIG. 28. In the present example, the NAND-type flash memory 100 which receives a write command for the block BLK0 from the controller 200 voluntarily writes the boot program not only into the block BLK0 but also into the block BLK1 in the above-described first example. Hereinafter, only a difference from the first example will be described.

As illustrated, in the NAND-type flash memory 100 which receives a write command for the block BLK0 from the controller 200, the boot program is written into the block BLK0 by the control circuit 440 (step S50). Next, the control circuit 440 increments a block address from "BA0000" to "BA0001", and writes the boot program into the block BLK1 (step S51).

Thereafter, status information regarding the writing operation on the block BLK1 is transmitted to the controller 200.

4.3 Third Example

Next, with reference to FIG. 29, a third example will be described. In the present example, the controller 200 issues a command when the boot program is written into the block BLK1 in the second example. Hereinafter, only a difference from the second example will be described.

As illustrated, if the boot program is written into the block BLK0 in step S50, the NAND-type flash memory 100 is brought into a ready state. In response thereto, the controller 200 issues a write command for the block BLK1. In response to this command, in the NAND-type flash memory 100, the boot program is written into the block BLK1.

4.4 Advantage of Present Embodiment

The boot program described in the first to third embodiments can be written to the NAND-type flash memory 100 by the method according to the present embodiment.

Some of the command sequences in the first to third examples may be omitted as necessary, or a new sequence may be added thereto.

For example, in the second and third examples, the flag PGM_F which is obtained by the host apparatus 500 by using the Get feature command is a flag regarding a writing operation on the block BLK1. If the flag PGM_F regarding the block BLK0 is necessary, the Get feature command may be separately issued. For example, in the second example, after a writing operation on the block BLK0 is completed, status information may be transmitted to the controller 200, and the status information may be read by using the Get feature command. Also in the third example, if the Get feature command is issued while a writing operation on the block BLK1 is being completed after a writing operation on the block BLK0 is completed, the flag PGM_F regarding the block BLK0 is obtained. Alternatively, two flags PRG_F may be provided in the feature table illustrated in FIG. 19, and results of the writing operations on the block BLK0 and the block BLK1 may be respectively allocated thereto.

If the flag PRG_F regarding the block BLK0 is not necessary, issuing of the status read command may be omitted after a writing operation on the block BLK0 is completed in the third example. In the third example, the same boot program as the program written into the block BLK0 is written into the block BLK1. Therefore, if the boot program remains in the NAND-type flash memory 100 after a writing operation on the block BLK0 is completed, transmission of data from the controller 200 to the NAND-type flash memory 100 may be omitted.

In the second and third examples, the memory system 1 writes data into two blocks including the block BLK0 and the block BLK1 regardless of the host apparatus 500 designating the single block BLK0 and issuing a write command. For example, the controller 200 or the NAND-type flash memory 100 can determine this operation based on a received block address. If "BA0000" is received as a block address, a sequence may be prepared such that data are written not only into the block BLK0 corresponding to the address but also into the block BLK1 corresponding to the block address "BA0001" which is incremented.

5. Modification Examples and the Like

As described above, the memory system according to the present embodiment includes the first pin (pin No. 1 in FIG. 4) that can receive the chip select signal (/CS in FIG. 4) from the host apparatus; the second pin (pin No. 2 in FIG. 4) that can output the first signal (SO in FIG. 4) to the host apparatus; the third pin (pin No. 5 in FIG. 4) that can receive the second signal (SI in FIG. 4) from the host apparatus; the fourth pin (pin No. 6 in FIG. 4) that can receive the clock (SCK in FIG. 4) from the host apparatus; the interface circuit (210 or 220 in FIG. 6) that recognizes, as a command, the second signal which is received by the third pin immediately after the asserted chip select signal is received; and the memory cell array (100 in FIG. 6) that includes the memory cell which can hold data and from which the data are erased in the block unit. The memory cell array includes the first block (BLK0 in FIG. 17) and the second block (BLK1 in FIG. 17). If first data in the first block (BLK0) is invalid (NO in step S13 in FIG. 18) when a read command for the first block (BLK0) is issued from the host apparatus, the interface circuit outputs second data read from the second block (BLK1) to the host apparatus in response to the read command for the first block (step S15 in FIG. 18).

As described above, since data are stored in blocks in a redundant manner, necessary data can be obtained from another block even if the data cannot be read from a certain block.

Embodiments are not limited to the above-described embodiments and may have various modifications. For example, blocks in which the boot program is stored are not limited to the blocks BLK0 and BLK1, and may be any blocks BLK. However, a block which is initially accessed during booting is preferably the block BLK0 to which the leading block address is allocated from the viewpoint of simplifying the boot sequence held in the host apparatus 500. In other words, preferably, the block BLK0 is used as a main block in which the boot program is held, and some other blocks are used as backup blocks. However, blocks other than the block BLK0 may be used as main blocks.

An address of a block designated by the host apparatus in order to read the boot program may be different from an address of a block in which the boot program is actually stored. As described above, a block which is accessed by the host apparatus during booting is the block BLK0 to which the leading block address is allocated. For example, if a read command is issued for the block BLK0 by the host apparatus with the block BLK1 as a main block, the boot program may be read from the block BLK1.

Blocks used as a main block and a backup block may be dynamically changed. For example, the block BLK0 may be used as a main block, and the block BLK1 may be used as a backup block. If the block BLK0 is a bad block, the block BLK1 may be used as a main block, and the boot program stored in the block BLK1 is voluntarily copied to blocks other than the block BLK0 and the block BLK1 so that other blocks may be used as backup blocks. In this case, even if a main block is changed, an address of a block designated by the host apparatus in order to read the boot program may not be changed. In the above-described example, even after the block BLK1 is used as a main block, an address of a block designated by the host apparatus in order to read the boot program may be still the block BLK0.

When the boot program is written into the main block BLK0, the host apparatus 500 may issue a command which is different from a normal command. In other words, as illustrated in FIG. 30, when the boot program is written into the main block BLK0 (YES in steps S60 and S61), the host apparatus may issue a boot program write command CMD_WR3 (step S62), and the normal write command CMD_WR1 in other cases (step S63). If the command CMD_WR3 is received, the memory system 1 performs the operation described with reference to FIGS. 28 and 29.

A main block and a backup block preferably have consecutive block addresses. This is because the memory system 1 can select the backup block only by incrementing the block address in this case. However, depending on cases, a block of which block address is not a consecutive address may be desired to be used as a backup block. As an example, the host apparatus 500 can select either one of the block BLK1 and the block BLK1023 as a backup block. In this case, a flag is provided in, for example, the status register 280 of the controller 200 or the status register 410 of the NAND-type flash memory 100. If the flag is not set (flag="0"), the block BLK1 may be used as a backup block, and if the flag is set (flag="1"), the block BLK1023 may be used as a backup block. In this case, the Set feature command may be used to set the flag. Of course, flags for both a backup block and a main block may be prepared, and the main block may be arbitrarily selected by setting the flags in the registers.

Figure 31:
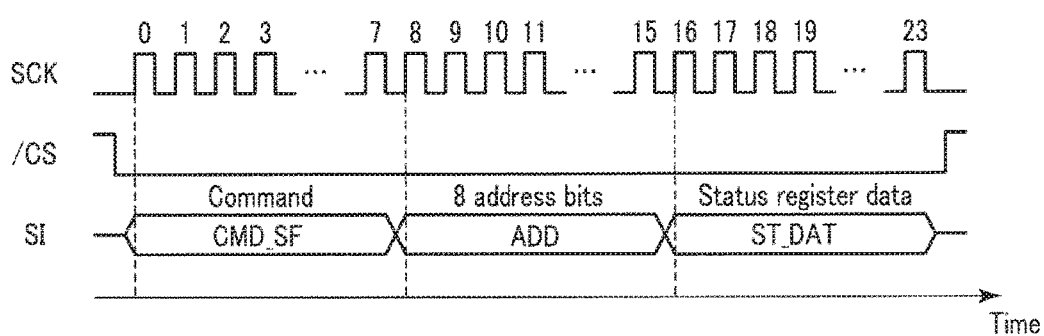
FIG. 31 is a timing chart of various signals during setting of information in the feature tables according to the first to fourth embodiments.

FIG. 31 is a timing chart of various signals on the SPI buses during issuing of the Set feature command. As illustrated, the host apparatus 500 asserts the signal /CS, issues the Set feature command CMD_SF as the signal SI, and also issues the clock SCK.

Next, the host apparatus 500 transmits an address ADD to the controller 200, for example, for 8 clock cycles. The address ADD is an address in the feature table, and is used to designate an entry including a bit for selecting the block BLK1 or the block BLK1023 as a backup block in the feature table. Subsequently, the host apparatus 500 transmits 8-bit data ST_DAT held in the entry of the feature table. The host apparatus 500 designates data in the feature table by using the data ST_DAT, and the flag is set in each register based on the data.

As described above, combinations of a main block and a backup block may be selected as appropriate. Both of the main block and the backup block may be determined by the host apparatus 500 (user), or the main block may be determined by a memory system manufacturer, and the backup block may be determined by the user. Alternatively, both of the two blocks may be determined by the memory system manufacturer.

If the boot program is written according to the sequence shown in FIG. 27, block addresses of both of the main block BLK0 and the backup block BLK1 are published to the host apparatus 500. In other words, the block BLK0 and the block BLK1 are memory areas which can be accessed by the host apparatus 500 without particular limitation.

Figure 28:
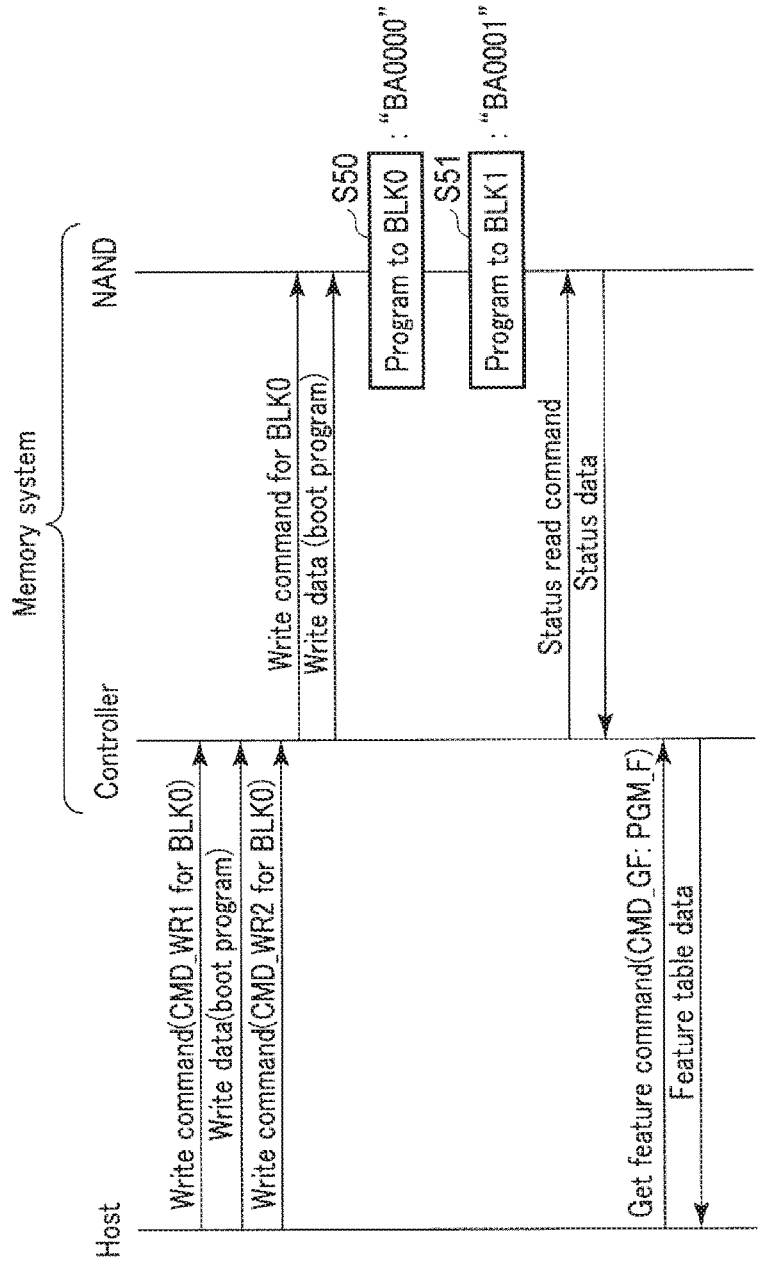
FIG. 28 is a flowchart illustrating another writing operation in the memory system according to the fourth embodiment.
Figure 29:
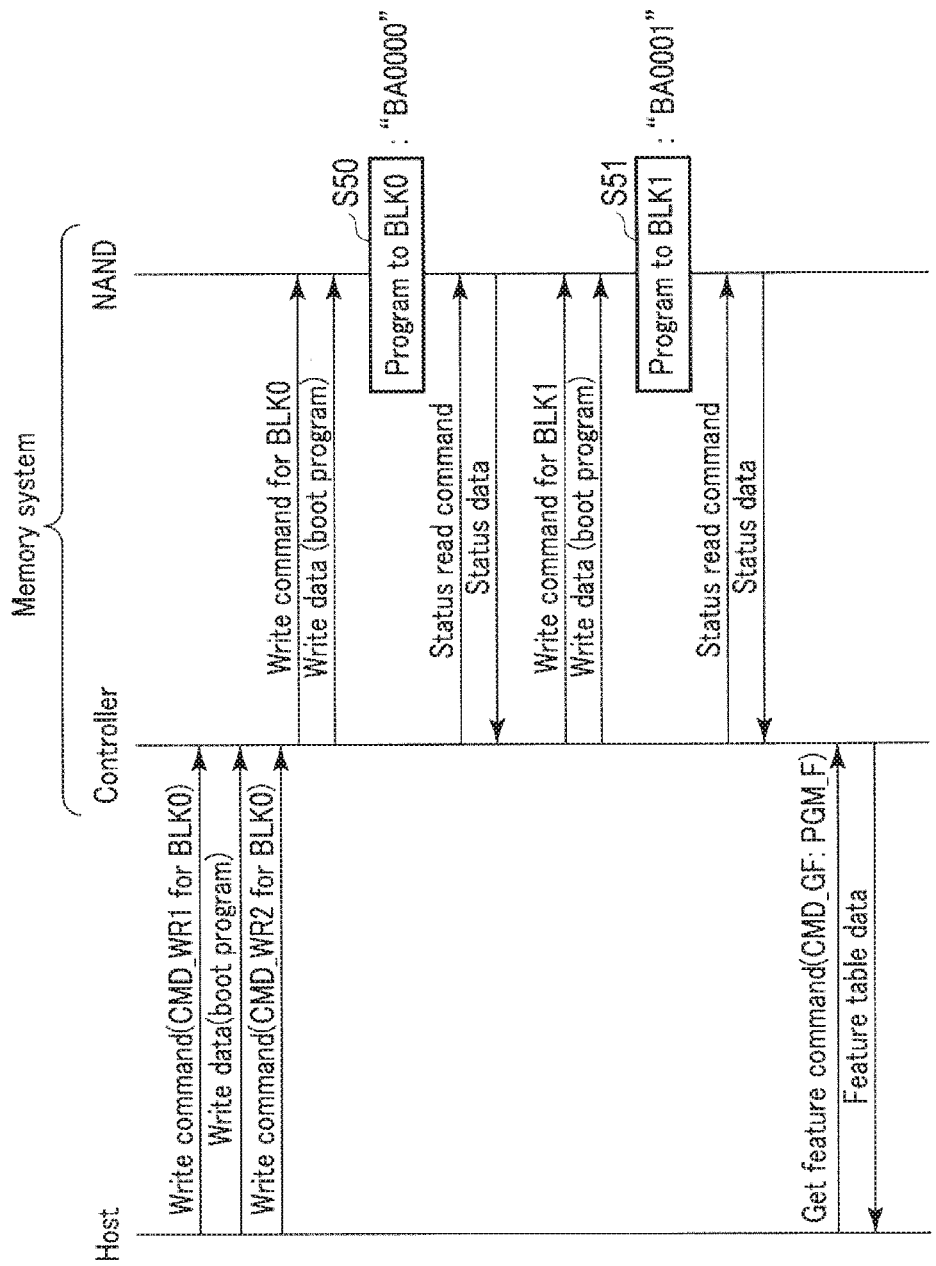
FIG. 29 is a flowchart illustrating still another writing operation in the memory system according to the fourth embodiment.
Figure 30:
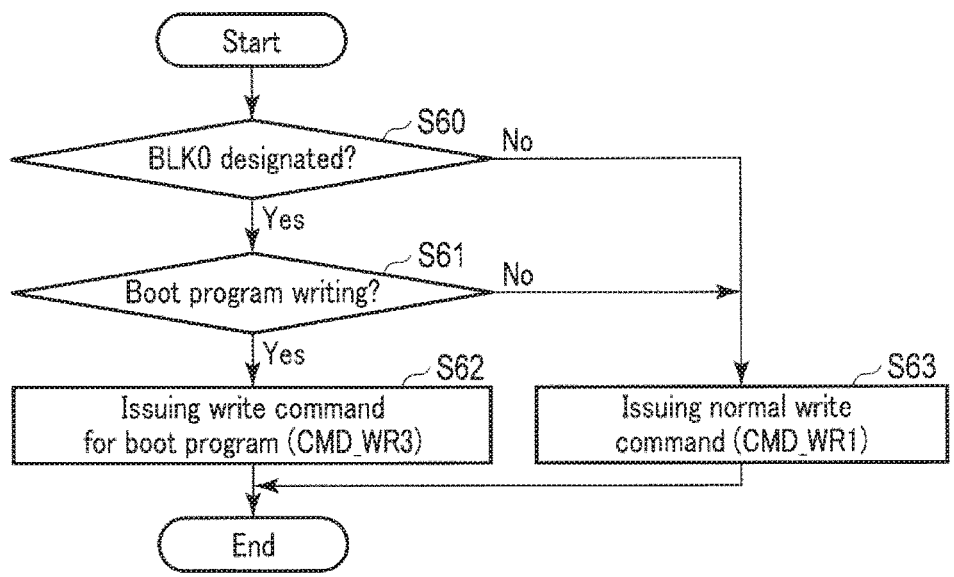
FIG. 30 is a flowchart illustrating an operation during issuing of a write command in the memory systems according to the first to fourth embodiments.

In contrast, if the boot program is written according to the sequence shown in FIGS. 28 and 29, the backup block BLK1 may be an area which is invisible from the host apparatus 500. In other words, the block BLK1 may be an area which cannot be accessed by the host apparatus 500 according to a normal method.

The NAND-type flash memory 100 may include two planes PN0 and PN1. The plane includes a set of, for example, the memory cell array 110, the row decoder 120, the sense amplifier 130, the data register 140, and the column decoder 150. The two planes are independent from each other and can be operated in parallel by the control circuit 440. A main block is in the plane PN0, and a backup block is in the plane PN1. In this case, the boot program can be written into the main block and the backup block in parallel, and thus a writing time can be reduced.

Figure 32:
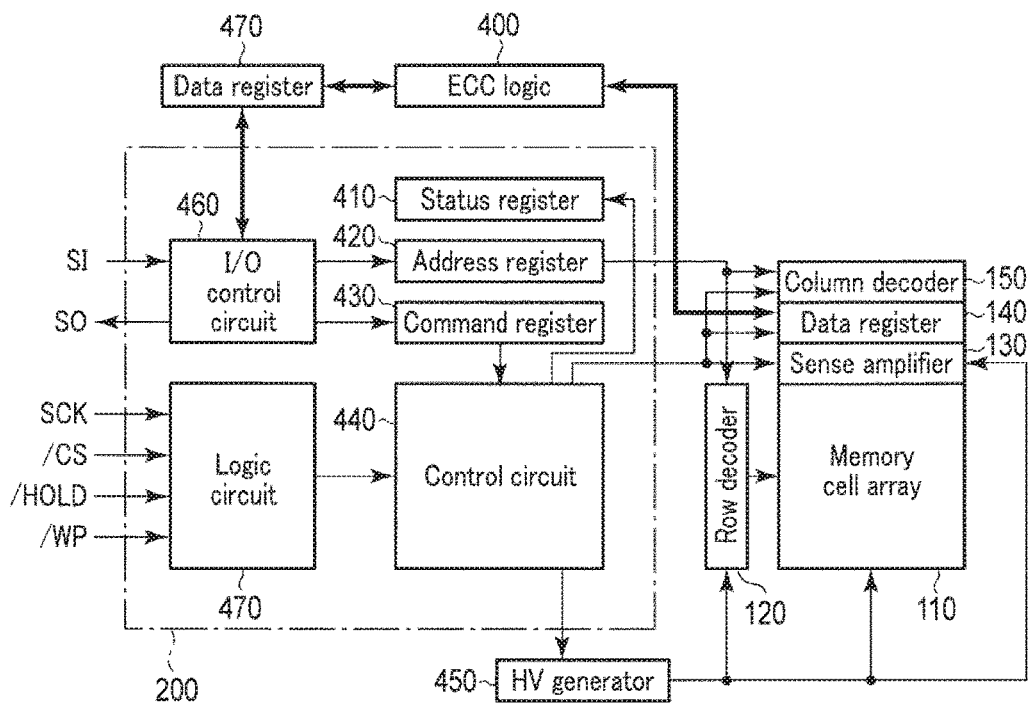
FIG. 32 is a block diagram of a memory system according to a modification example of the first to fourth embodiments.

For example, in the above-described embodiments, the NAND-type flash memory 100 and the controller chip 200 are implemented in separate semiconductor chips. Alternatively, the elements may be formed of one chip. FIG. 32 is a block diagram of the memory system 1 in this case.

As illustrated, a block configuration is the same as in FIG. 7, but the signals SCK, /CS, /HOLD and /WP from the host apparatus 500 are input to the logic circuit 470, and the signals SI and SO are input and output via the input/output control circuit 460. The registers 410 and 430, the control circuits 440 and 460, and the logic circuit 470 function as the controller 200. In other words, the control circuit 440 functions as the sequencer 250 and the host interface circuit 220, and discriminates commands from the host apparatus 500 from each other by using the signal /CS. The input/output control circuit 460 and the logic circuit 470 function as the host input/output circuit 210. The registers 410 and 420 function as the registers 280 and 290, and the feature table is held in, for example, the status register 410 or the like.

The respective processes in the above-described flowcharts may be changed in order of the processes as appropriate. The timing charts described in the above embodiments are only examples. The number of clock cycles which are required to input the signal SI or the number of clock cycles which are required to output the signal SO are not limited to those in the above embodiments. In addition, the case where dummy bits are input immediately after a command is issued depending on the command is described as an example, and should not be viewed as limiting. This is also the same for the feature table, and is not limited to the form described in the embodiments as long as the information described in the embodiments can be held therein.

The first to fourth embodiments may be arbitrarily combined with each other, and may be performed as separately from each other as possible. For example, the first example and the second example described in the second embodiment may be selectively executed, and this is also the same for the third embodiment. The host apparatus 500 may execute all of the first to third examples described in the fourth embodiment. The host apparatus 500 in the fourth embodiment may be different from the host apparatus 500 in the first to third embodiments. In the first to third embodiments, the memory system 1 and the host apparatus 500 may be specially configured for a certain application. Examples of the application include a television set or a set top box. In terms of this fact, the host apparatus 500 in the fourth embodiment may be a kind of manufacturing apparatus which writes the boot program to the memory system 1 in order to ship the application.

Figure 33:
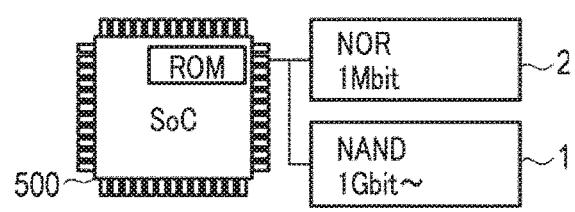
FIGS. 33 and 34 are each a conceptual diagram of a system that employs the memory systems according to the first to fourth embodiments.

The memory systems described in each of the first to fourth embodiments may be applied to, for example, a television set or a set top box. FIG. 33 illustrates an example of such a system. In the present example, a NOR-type flash memory 2 is provided in addition to the memory system 1. Both the memory system 1 and the NOR-type flash memory 2 are connected to an SPI interface. In the present example, commands (the commands CMD_RD1, CMD_RD2, CMD_GF, and CMD_SF, and the like) for controlling the memory system 1 are held in the NOR-type flash memory 2. During booting of the host apparatus 500, the host apparatus 500 reads the command information from the NOR-type flash memory 2 according to a sequence held in a ROM of the host apparatus 500. The host apparatus 500 reads a boot sequence from the memory system 1 by using the command information, and the application is booted by executing the boot sequence.

Figure 34:
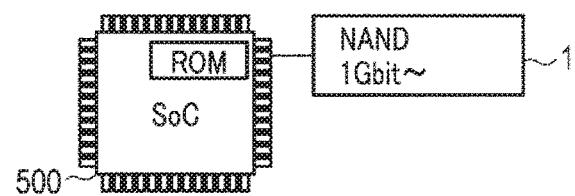

Alternatively, if the command information regarding the memory system 1 is held in the ROM of the host apparatus 500, the NOR-type flash memory 2 may be omitted as illustrated in FIG. 34.

The NAND-type flash memory can be highly integrated at lower cost than the NOR-type flash memory. Therefore, the NAND-type flash memory is preferably used to hold various kinds of software including the boot program. If a NAND-type flash memory provided with a serial interface conforming to the SPI or the like is used, the NOR-type flash memory may be replaced therewith. In the NAND-type flash memory, data are erased in the block unit, and thus the entire block may become a bad block, unlike the NOR-type flash memory. However, even if this case occurs, stability of the system can be considerably improved by applying one or more of the above embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
   a non-volatile semiconductor memory device including a plurality of non-volatile memory blocks, including a first block storing data, a second block storing backup data, a third block that stores first status data indicating which blocks of the non-volatile memory blocks became defective after product shipment, and a read-only memory (ROM) fuse area storing second status data indicating one or more of the non-volatile memory blocks that were defective at the product shipment, the ROM fuse area being different from the third block;
a plurality of pins for connection to outside of the memory system, the pins including:
   a first pin configured to receive a chip select signal,
   a second pin configured to receive a clock signal,
   a third pin configured to receive a command in synchronization with the clock signal, and
   a fourth pin configured to receive from the outside of the memory system a write protect signal that inhibits writing of data into the non-volatile semiconductor memory device, the fourth pin being configured to output serial data to the outside of the memory system;
a controller configured to update the first status data and output a control signal to the non-volatile semiconductor memory device in accordance with the command; and
a resin package sealing the non-volatile semiconductor memory device and the controller, wherein
when the controller receives from outside of the memory system a read command for the data in the first block, and the data in the first block are available, the controller transmits the data in the first block to the outside of the memory system,
when the controller receives from outside of the memory system a read command for the data in the first block, and the data in the first block are not available, the controller transmits the backup data in the second block to the outside of the memory system, and
the data in the first block are not available, when the first block is indicated as defective in the status data in the third block.

2. The memory system according to claim 1, wherein the data in the first block include a boot program for a host, and the backup data in the second block include a copy of the boot program for the host.

3. The memory system according to claim 2, wherein the read command is received from the host and the backup data are transmitted to the host in response to the read command.

4. The memory system according to claim 1, wherein the non-volatile semiconductor memory device further includes an error correction code (ECC) circuit configured to carry out an error correction process with respect to the data read from the first block, and a control circuit, and
the control circuit determines that the data in the first block are not available, when a number of error bits included in the data that have been subjected to the error correction process is greater than a predetermined value.

5. The memory system according to claim 1, wherein the non-volatile semiconductor memory device further includes a control circuit configured to determine that the data in the first block are not available when the first block is indicated as defective in the status data, determine that the data in the first block are available when the first block is indicated as not defective in the status data, and read the data in the first block upon determining that the data in the first block are available.

6. The memory system according to claim 1, wherein the controller further includes a register configured to store status data read from the third block before the controller receives the read command, and
the controller determines whether or not the data in the first block are available based on the status data stored in the register, and issues a command to the non-volatile semiconductor memory device to read the data in the first block upon determining that the data in the first block are available.

7. The memory system according to claim 1, wherein when the controller receives from outside of the memory system the read command for the data in the first block, and the data in the first block are available, the controller issues a command to the non-volatile semiconductor memory device to read the data in the first block prior to transmitting the data in the first block to the outside of the memory system, and
when the controller receives from outside of the memory system the read command for the data in the first block, and the data in the first block are not available, the controller issues a command to the non-volatile semiconductor memory device to read the backup data in the second block prior to transmitting the data in the second block to the outside of the memory system.

8. The memory system according to claim 1, wherein the controller is further configured to receive, from outside of the memory system, the data and a write command to write the data and
the non-volatile semiconductor memory device further includes a control circuit that is configured to write the data in the first block after reception of the data.

9. The memory system according to claim 8, wherein the control circuit is further configured to write the data in the second block as the backup data after the reception of the data.

10. The memory system according to claim 1, wherein the non-volatile semiconductor memory device is implemented in a first semiconductor chip and the controller is implemented in a second semiconductor chip.

11. The memory system according to claim 1, wherein the non-volatile semiconductor memory device and the controller are integrated in a single semiconductor chip.

12. The memory system according to claim 1, wherein signals received and transmitted through the plurality of pins are processed in accordance with protocol of Serial Peripheral Interface (SPI).

13. The memory system according to claim 1, wherein the controller is configured to recognize that a signal is received through the third pin immediately after the chip select signal is asserted as a command.

14. The memory system according to claim 1, wherein the second block is an area not accessible by a host.

* * * * *